(12) United States Patent
Fry

(10) Patent No.: US 10,977,757 B2
(45) Date of Patent: Apr. 13, 2021

(54) VIDEO RECORD RECEIPT SYSTEM AND METHOD OF USE

(71) Applicant: James Brian Fry, Greenwood, LA (US)

(72) Inventor: James Brian Fry, Greenwood, LA (US)

(*) Notice: Subject to any disclaimer, the term of this patent is extended or adjusted under 35 U.S.C. 154(b) by 567 days.

(21) Appl. No.: 15/619,657

(22) Filed: Jun. 12, 2017

(65) Prior Publication Data

US 2017/0278212 A1     Sep. 28, 2017

Related U.S. Application Data

(63) Continuation-in-part of application No. 14/029,801, filed on Sep. 18, 2013, now abandoned.

(51) Int. Cl.
| | |
|---|---|
| G06Q 50/28 | (2012.01) |
| H04N 21/2743 | (2011.01) |
| H04N 21/258 | (2011.01) |
| G06Q 10/08 | (2012.01) |
| G06Q 30/06 | (2012.01) |

(52) U.S. Cl.
CPC .......... *G06Q 50/28* (2013.01); *G06Q 10/083* (2013.01); *G06Q 30/06* (2013.01); *H04N 21/25816* (2013.01); *H04N 21/2743* (2013.01)

(58) Field of Classification Search
CPC ...... G06Q 50/28; G06Q 10/083; G06Q 30/06; H04N 21/25816; H04N 21/2743
USPC .......................................................... 705/330
See application file for complete search history.

(56) References Cited

U.S. PATENT DOCUMENTS

| | | |
|---|---|---|
| 6,213,395 B1 | 4/2001 | Dejaeger et al. |
| 6,296,184 B1 | 10/2001 | Dejaeger |
| 6,296,185 B1 | 10/2001 | Dejaeger |
| 6,343,739 B1 | 2/2002 | Lippert |
| 6,354,497 B1 | 3/2002 | Lippert et al. |
| 6,390,363 B1 | 5/2002 | Morrison et al. |
| 6,408,279 B1 | 6/2002 | Msaon |
| 6,409,081 B1 | 6/2002 | Nugent, Jr. |
| 6,427,914 B1 | 8/2002 | Snyder |
| 6,427,915 B1 | 8/2002 | Wike, Jr. et al. |
| 6,502,749 B1 | 1/2003 | Snyder |
| 6,530,520 B1 | 3/2003 | Snyder et al. |
| 6,540,137 B1 | 4/2003 | Forsythe et al. |
| 7,304,662 B1 | 12/2007 | Sullivan et al. |

(Continued)

OTHER PUBLICATIONS

"Embedded Video Processing and Data Acquisition for Unmanned Aerial Vehicle," by Vrunal Mhatre; Suddhesh Chavan; Aaron Samuel; Akshay Patil; Ashish Chittimilla; and Naveen Kumar. 2015 International Conference on Computers, Communications, and Systems. (Year: 2015).*

*Primary Examiner* — Sara C Hamilton
(74) *Attorney, Agent, or Firm* — Daniel M. Cohn; Howard M. Cohn

(57) ABSTRACT

Methods and systems for authenticated video acquisition and dissemination are disclosed. A temporally continuous video is acquired and sent to a server. Metadata and authentication information is combined with the video. The video, incorporating metadata and authentication information is provided from a first party to a second party by a third party that provides authentication of the video. Embodiments can be used to generate a video receipt for purposes of creating evidence of shipment of a package to an intended recipient.

13 Claims, 18 Drawing Sheets

(56) References Cited

U.S. PATENT DOCUMENTS

| | | | |
|---|---|---|---|
| 7,665,114 B2* | 2/2010 | Safran | H04N 7/181 348/211.3 |
| 8,448,858 B1 | 5/2013 | Kundu et al. | |
| 9,244,147 B1* | 1/2016 | Soundararajan | G01S 1/44 |
| 9,448,562 B1* | 9/2016 | Sirang | G05D 1/0676 |
| 9,567,081 B1* | 2/2017 | Beckman | B64D 1/12 |
| 9,643,718 B1* | 5/2017 | Beckman | B64C 27/463 |
| 9,741,010 B1* | 8/2017 | Heinla | G06Q 10/083 |
| 9,969,486 B1* | 5/2018 | O'Brien | B64C 39/024 |
| 9,972,212 B1* | 5/2018 | Sperindeo | G08G 5/0069 |
| 9,992,470 B1* | 6/2018 | Hofmann | H04N 5/772 |
| 10,029,787 B1* | 7/2018 | Lesser | B64C 39/02 |
| 10,032,275 B1* | 7/2018 | Watson | G01C 25/00 |
| 10,249,200 B1* | 4/2019 | Grenier | G05D 1/101 |
| 10,287,006 B1* | 5/2019 | Beckman | B64C 39/024 |
| 10,322,801 B1* | 6/2019 | Yeturu | G06K 9/0063 |
| 10,370,098 B1* | 8/2019 | Beckman | B64C 27/57 |
| 2003/0007663 A1 | 1/2003 | Wixson et al. | |
| 2004/0005078 A1* | 1/2004 | Tillotson | G06Q 10/10 382/100 |
| 2005/0254776 A1* | 11/2005 | Morrison | H04N 5/781 386/231 |
| 2008/0184245 A1 | 7/2008 | St-Jean | |
| 2008/0218590 A1 | 9/2008 | Park et al. | |
| 2008/0218591 A1 | 9/2008 | Heier et al. | |
| 2009/0307097 A1 | 12/2009 | De Faria | |
| 2010/0118158 A1* | 5/2010 | Boland | H04N 5/23293 348/211.2 |
| 2010/0274728 A1 | 10/2010 | Kugelman | |
| 2010/0281156 A1* | 11/2010 | Kies | H04W 4/00 709/224 |
| 2011/0025842 A1* | 2/2011 | King | G06F 17/211 348/E7.085 |
| 2011/0035240 A1 | 2/2011 | Joao | |
| 2011/0043652 A1* | 2/2011 | King | G06F 17/2211 348/222.1 |
| 2011/0096174 A1* | 4/2011 | King | G06F 21/31 348/207.1 |
| 2011/0103643 A1* | 5/2011 | Salsman | G06K 9/00261 382/103 |
| 2011/0109747 A1* | 5/2011 | Forrester | G08B 13/19671 348/152 |
| 2011/0149086 A1 | 6/2011 | Winbush, III | |
| 2012/0063736 A1* | 3/2012 | Simmons | H04N 21/4786 386/224 |
| 2012/0210077 A1* | 8/2012 | Hoshino | G11B 20/10527 711/154 |
| 2013/0018788 A1 | 1/2013 | Johnson et al. | |
| 2013/0162761 A1* | 6/2013 | Goldemann | H04N 5/232 348/36 |
| 2013/0182002 A1* | 7/2013 | Macciola | G06K 9/00463 345/589 |
| 2013/0201307 A1* | 8/2013 | Schloter | H04N 5/23229 348/61 |
| 2013/0238168 A1* | 9/2013 | Reyes | B64C 39/024 701/2 |
| 2014/0212107 A1* | 7/2014 | Saint-Jean | G11B 27/031 386/241 |
| 2014/0232863 A1 | 8/2014 | Paliga et al. | |
| 2014/0254896 A1* | 9/2014 | Zhou | G06Q 20/3829 382/124 |
| 2015/0039466 A1* | 2/2015 | Skinner | G06Q 30/0609 705/26.35 |
| 2015/0248640 A1* | 9/2015 | Srinivasan | G06Q 10/08355 705/338 |
| 2015/0317596 A1* | 11/2015 | Hejazi | G06Q 10/083 705/330 |
| 2015/0317597 A1* | 11/2015 | Shucker | G06Q 10/0833 235/375 |
| 2015/0332206 A1* | 11/2015 | Trew | G06Q 10/083 705/330 |
| 2015/0356501 A1* | 12/2015 | Gorjestani | G06Q 10/0833 705/333 |
| 2015/0358577 A1* | 12/2015 | Zhou | H04N 7/15 348/14.01 |
| 2015/0358580 A1* | 12/2015 | Zhou | H04N 7/15 348/14.07 |
| 2015/0358581 A1* | 12/2015 | Zhou | H04N 7/15 348/14.07 |
| 2016/0012393 A1* | 1/2016 | Wang | G06Q 10/08355 705/338 |
| 2016/0033966 A1* | 2/2016 | Farris | A47G 29/141 701/15 |
| 2016/0068264 A1* | 3/2016 | Ganesh | B64C 39/024 701/2 |
| 2016/0068265 A1* | 3/2016 | Hoareau | G06Q 10/083 701/3 |
| 2016/0280371 A1* | 9/2016 | Canavor | H04L 9/3263 |
| 2016/0285863 A1* | 9/2016 | Canavor | H04W 12/0609 |
| 2016/0285864 A1* | 9/2016 | Canavor | H04W 4/12 |
| 2017/0090484 A1* | 3/2017 | Obaidi | B64D 47/08 |
| 2017/0091710 A1* | 3/2017 | Van Dyke | H04L 67/42 |
| 2017/0091711 A1* | 3/2017 | Akselrod | B64C 39/024 |
| 2017/0174338 A1* | 6/2017 | Beckman | B64C 27/20 |
| 2017/0175531 A1* | 6/2017 | Beckman | B64C 39/024 |
| 2017/0203857 A1* | 7/2017 | O'Toole | A47G 29/141 |
| 2017/0219676 A1* | 8/2017 | Tran | G01S 19/015 |
| 2017/0228690 A1* | 8/2017 | Kohli | G06Q 10/0832 |
| 2017/0228692 A1* | 8/2017 | Pargoe | B65D 43/16 |
| 2017/0253335 A1* | 9/2017 | Thompson | B64D 1/22 |
| 2017/0262789 A1* | 9/2017 | Zhang | G06Q 10/08 |
| 2017/0274978 A1* | 9/2017 | Beckman | B64C 39/024 |
| 2017/0274979 A1* | 9/2017 | Beckman | B64C 27/80 |
| 2017/0274982 A1* | 9/2017 | Beckman | B64C 3/46 |
| 2017/0274983 A1* | 9/2017 | Beckman | B64C 11/30 |
| 2017/0286892 A1* | 10/2017 | Studnicka | G06Q 20/204 |
| 2017/0293884 A1* | 10/2017 | Cheatham, III | G01G 19/07 |
| 2017/0293991 A1* | 10/2017 | High | G06K 9/00771 |
| 2017/0300855 A1* | 10/2017 | Lund | G06Q 30/0635 |
| 2017/0320572 A1* | 11/2017 | High | G05D 1/0011 |
| 2017/0323256 A1* | 11/2017 | Cheatham, III | G06Q 10/0832 |
| 2017/0323257 A1* | 11/2017 | Cheatham, III | G06Q 10/0631 |
| 2017/0361942 A1* | 12/2017 | Jalaldeen | B64D 1/02 |
| 2017/0372259 A1* | 12/2017 | Lesser | G01C 21/165 |
| 2018/0005180 A1* | 1/2018 | Jalaldeen | G01C 21/3605 |
| 2018/0005183 A1* | 1/2018 | Nguyen | G06Q 10/0836 |
| 2018/0016027 A1* | 1/2018 | Cheatham, III | G06Q 10/0832 |
| 2018/0059659 A1* | 3/2018 | Takeuchi | G06Q 10/083 |
| 2018/0090014 A1* | 3/2018 | Kline | G06Q 10/08355 |
| 2018/0111683 A1* | 4/2018 | Di Benedetto | G06Q 30/04 |
| 2018/0144302 A1* | 5/2018 | Murray | G06K 9/00885 |
| 2018/0204178 A1* | 7/2018 | Arshad | H04W 4/025 |
| 2018/0218310 A1* | 8/2018 | Hansmann | H04W 12/06 |
| 2018/0265194 A1* | 9/2018 | Gauglitz | B64C 39/024 |
| 2018/0265295 A1* | 9/2018 | Beckman | B25J 11/00 |
| 2018/0265296 A1* | 9/2018 | Beckman | G06Q 30/0202 |
| 2018/0270785 A1* | 9/2018 | Hall | H04W 4/14 |
| 2018/0330323 A1* | 11/2018 | Trew | G06Q 10/0836 |
| 2019/0019141 A1* | 1/2019 | Torii | H04W 4/40 |
| 2019/0050789 A1* | 2/2019 | Ko | G06Q 10/08 |
| 2019/0080620 A1* | 3/2019 | Sugaya | G08G 5/006 |
| 2019/0174063 A1* | 6/2019 | Huang | B64D 47/08 |
| 2019/0182428 A1* | 6/2019 | Huang | H04N 5/23258 |
| 2019/0208120 A1* | 7/2019 | Huang | B64D 47/08 |
| 2019/0210720 A1* | 7/2019 | Beckman | B64C 27/57 |
| 2019/0228170 A1* | 7/2019 | Chen | G06F 21/30 |
| 2019/0230083 A1* | 7/2019 | Chen | G06F 16/219 |
| 2019/0230721 A1* | 7/2019 | Chen | H04L 41/0803 |

* cited by examiner

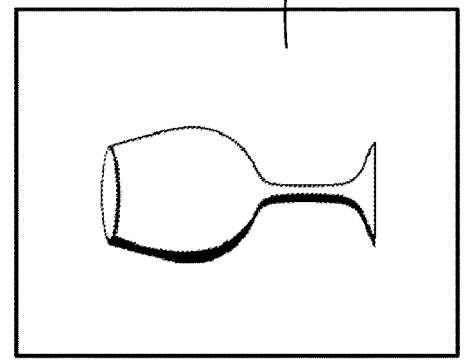
FIG. 14

VIDEO RECORD RECEIPT SYSTEM AND METHOD OF USE

FIELD OF THE INVENTION

The present invention relates generally to a system and method of creating a video record receipt relating to the shipment of packages.

BACKGROUND

Today, it has become commonplace for persons generally unknown to each other to send packages from one to the other, whether it is from a commercial distribution company, such as Amazon™ or the like, or an individual through services like eBay™. The problem is that sometimes a package does not arrive or arrives damaged, and the sender wants to be able to show that the package was actually sent, was sent to the correct address and was not damaged when deposited with the shipping company. Disputes relating to such events occur frequently, with many ending up in litigation. A written record is often provided for shipping transactions, but written records still leave room for dispute. Thus, a need exists for an improved way to prove when a package has been properly and safely shipped to the appropriate recipient.

SUMMARY

In one embodiment, there is provided a computer-implemented method for delivering a video, comprising: receiving, on a video server, a temporally continuous video from a first client device; receiving, on the video server, metadata for the received temporally continuous video from the first client device; creating a uniform resource locator for the video; and sending the uniform resource locator to a second client device.

In another embodiment, there is provided an electronic device for acquiring a video, comprising: a processor; a memory coupled to the processor; a digital camera coupled to the processor; wherein the memory contains instructions, that when executed by the processor, perform steps of: acquiring a temporally continuous video from the digital camera; adding metadata to the video; and sending the video and metadata to a video server.

In yet another embodiment, there is provided a computer program product for acquiring a video on an electronic device, the electronic device comprising a computer readable storage medium having program instructions embodied therewith, the program instructions executable by a processor to cause the electronic computing device to: acquire a temporally continuous video; add metadata to the video; and send the video and metadata to a video server.

BRIEF DESCRIPTION OF THE DRAWINGS

FIG. 14 is an exemplary e-commerce interface showing integration of a video record in accordance with embodiments of the present invention.

DETAILED DESCRIPTION

Methods and systems for authenticated video acquisition and dissemination are disclosed. A temporally continuous video is acquired and sent to a server. Metadata and authentication information is combined with the video. The video, incorporating metadata and authentication information is provided from a first party to a second party by a third party that provides authentication of the video. Embodiments can be used to generate a video receipt for purposes of creating evidence of shipment of a package to an intended recipient.

Figure 1:
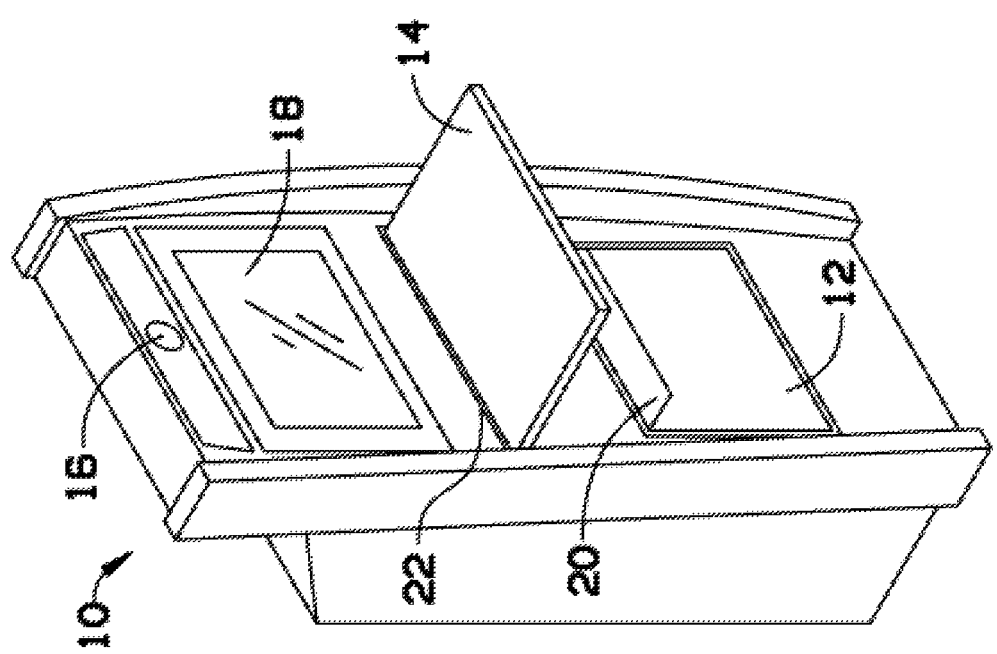
FIG. 1 shows a schematic perspective view of one embodiment of the present invention.
Figure 2:
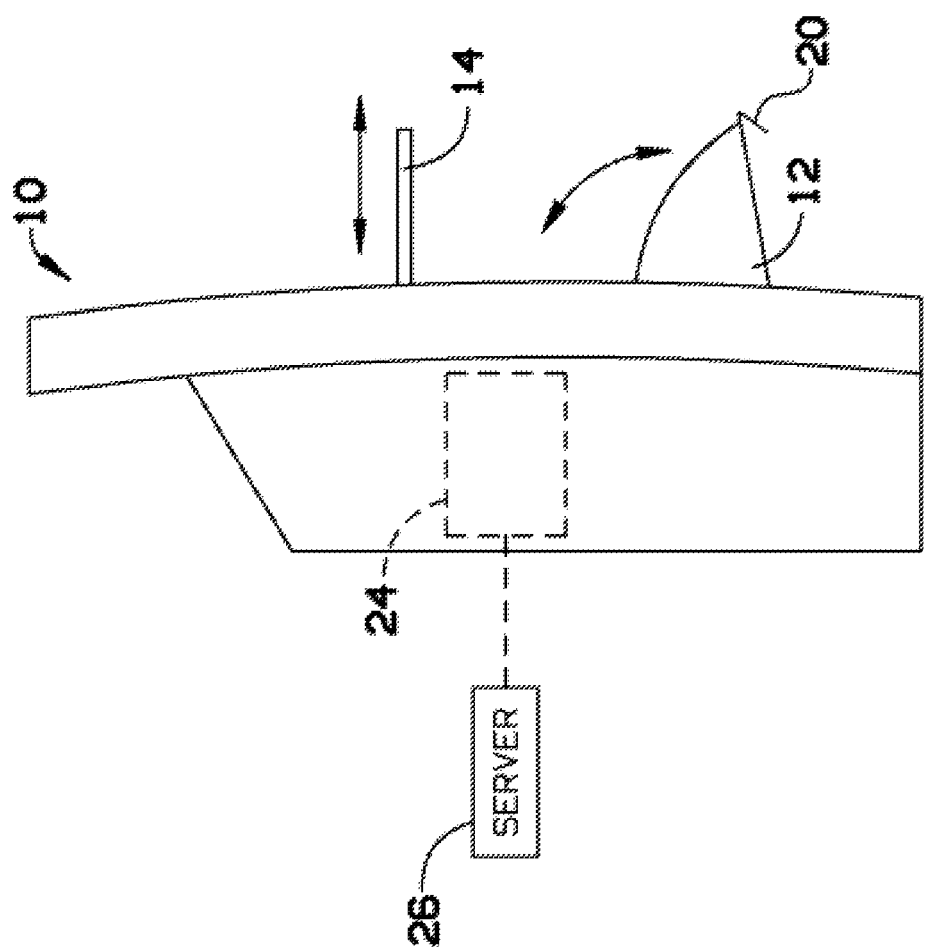
FIG. 2 shows a schematic side view of the embodiment of FIG. 1.

By way of example, and referring to FIGS. 1 and 2, one embodiment of the present invention comprises a kiosk 10 of any shape or size generally, but configured to be placed accessibly in a public place for those who wish to send packages. The particular example of the embodiment shown in FIG. 1 has a generally vertical orientation not unlike airline ticket kiosks.

In one embodiment, system 10 comprises a drop box 12 with handle 20 configured to permit a user to open the drop box and place a package into the drop box 12 so that when closed the package is inaccessible except by an authorized shipping agent. In that regard, a locked door may be provided on the back of the system kiosk 10 to permit such an agent to retrieve packages for shipment later. In some embodiments, a retractable surface 14 may be provided to permit a user to conduct business while using the system. As shown in FIG. 2, the retractable surface 14 may slide horizontally into and out of the kiosk as needed. It could also be a pull down table if so desired. Numerous configurations of a work surface are contemplated.

The kiosk preferably also comprises a video camera 16 mounted on or within, or merely just connected to, the kiosk 10 in a manner that permits the user to record the shipment transaction they wish to conduct. In the case of the example shown, the video camera 16 is mounted proximate the top of the kiosk 10 so that the user is in view. The angle of the video camera, either as permanently mounted, or as mounted in a rotatable or adjustable fashion, is preferably such that the camera may capture a video of the user placing one or more packages into the drop box 12.

In that regard, the kiosk 10 preferably includes a computer system 24 having a graphic user interface 18, a means for connecting to a public or private network, including the Internet, and a means for electronically communicating with one or more recipients. In some examples, the graphic user interface comprises a touch screen 18, or it may comprise a monitor electronically (wired or wirelessly) coupled to a keyboard that may reside on the work surface 14 or may be stored from a hook or space within the kiosk 10.

The connecting and communicating means are preferably applications downloadable to the computer system 24 or software that can be installed onto the computer system 24 to permit the user access to the network and to send a video file and possibly also a text file or image file to a recipient. It is contemplated that the application or software is configured to permit a user to establish an account with the provider of the system for secure shipping of packages and to ensure appropriate authentication. The application and/or software may reside on the computer system 24 or on a server 26 in electrical communication (wired or wirelessly) with the computer system 24.

It is also contemplated that the recipient of the video and possible other electronic communication be either the intended recipient of the package or an intermediary in case the recipient desires to remain relatively incognito. The recipient may simply be the shipping company tasked with ensuring that the package safely arrives at its intended destination, where the shipping company sends the video recording the package recipient to prove that it has been sent, and then follows up by sending the package.

Figure 3:
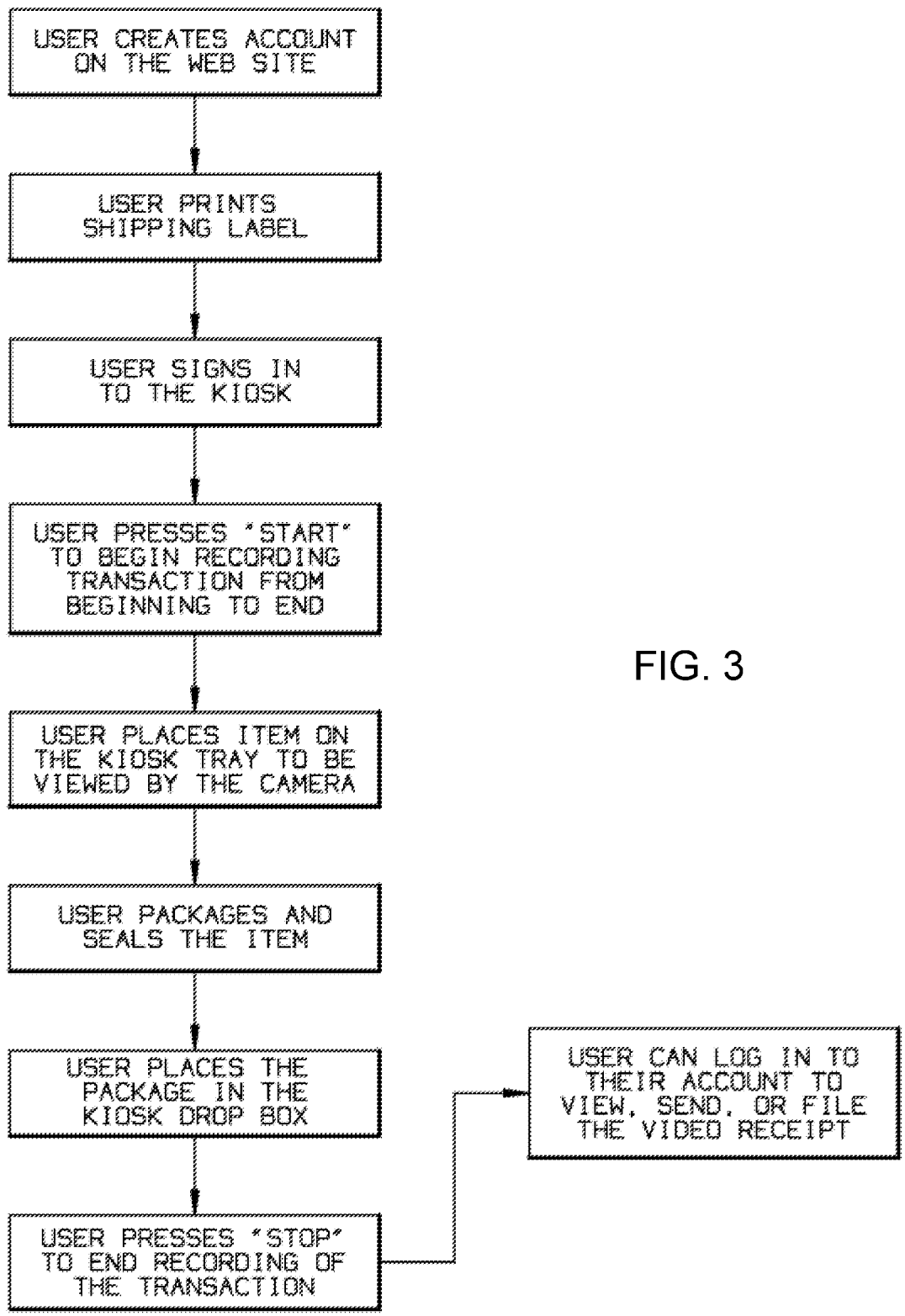
FIG. 3 shows a flow chart of one application of a method of using embodiments of the present invention.

Of course, one method is where the user video records the package and the insertion of the package into the drop box, and then, by way of the user's account and use of the computer system, emails, texts or otherwise electronically sends the video recording to the intended package recipient to show that the package has been handed off, so to speak. This video recording may also be referred to as a "RecordReceipt." More specifically, and referring to FIG. 3, one example of a method of use of the present invention comprises a user creating an account on a website of a web-based secure shipping application, printing labels for the package from a label printer (not shown) provided on the kiosk, signing into the user's account, actuating the video camera to commence recording of the package and/or wrapping of the package, placing the package or packages into the drop box, stopping the recording session, and then transmitting the video file to a recipient as a video receipt. With this and other methods of the present invention, regardless of who the intended recipient of the video recording is, if the package does not arrive, the video recording may be used by the sender as evidence that the package was sent.

It is also contemplated that embodiments of the present invention herein permit a user to pick up a package. In other words, such embodiments may be configured for the package "recipient" to log into their account, pick up their package, and acknowledge to the sender that the package has been received. If there are any damage or item issues relating to the package, the "recipient" can video record the package as received and transmit to the sender the exact condition as received. In this way, both the sender and the recipient have video evidence of the package as sent and as received, respectively. Thus, for an additional layer of protection, the recipient can video record the package being opened for the first time to ensure that the package has not been altered or touched in any way by the recipient and transmit to the sender the exact condition as received.

In other applications, embodiments of the present invention may be employed by business establishments at points-of-sale locations for the protection of customers. As many will appreciate, for years, customers have ordered desired items (e.g., at a fast food restaurant) or have brought to a cashier desired items (e.g., at a retail store) for purchase only to arrive home and find that one of the items paid for is missing from the bag. That is a very frustrating situation because now it's the word of the customer versus the word of the cashier. In a perfectly honest world, or a world in which the business establishment believes that "the-customer-is-always-right," such problems would be easily remedied. But they are very often not satisfactorily remedied by the business establishment, to the consternation of the customer. Thus, to solve that issue, embodiments of the present invention include a methodology involving customer transactions in which a video camera is positioned, for example at a point-of-sale location, so that the bagging of the items purchased may be recorded to show exactly which items were placed into the bag(s) at the time of purchase. The video recording would then be saved to a database by the business establishment, where the recording may then be offered to customers as a "video receipt" of the transaction.

In one embodiment of this methodology, the database is made accessible to the customer from a web-site created by the business establishment to permit the customer to view the video receipt based upon the input of certain identifying information about the transaction. For example, the paper receipt received by the customer might have a transaction number, which the customer could input into the web page to retrieve and view the video receipt. Or, in case the paper receipt is misplaced or lost, the customer might enter the time of the transaction and identify some or all of the items purchased, to permit the web-based system to properly identify which of the transactions the customer was involved in, in order to retrieve the video receipt. In such methodologies, where a discrepancy has occurred between what a customer paid for and what the customer received can be resolved more accurately. Indeed, such a video receipt could also beneficially serve to protect a person from identity theft. For example, if a business establishment is seeking to collect payment from a person based upon an allegation that the person received goods or services from the business, but it was not the person who actually received the goods or services, the alleged person can be permitted to view the video recording of the transaction to prove that it was a different person, not the alleged person. Thus, it is contemplated that the invention herein includes systems and methods implemented by businesses for point-of-sale transactions or, candidly, any type of transaction to safeguard the customers from incomplete service or identity theft.

Figure 4:
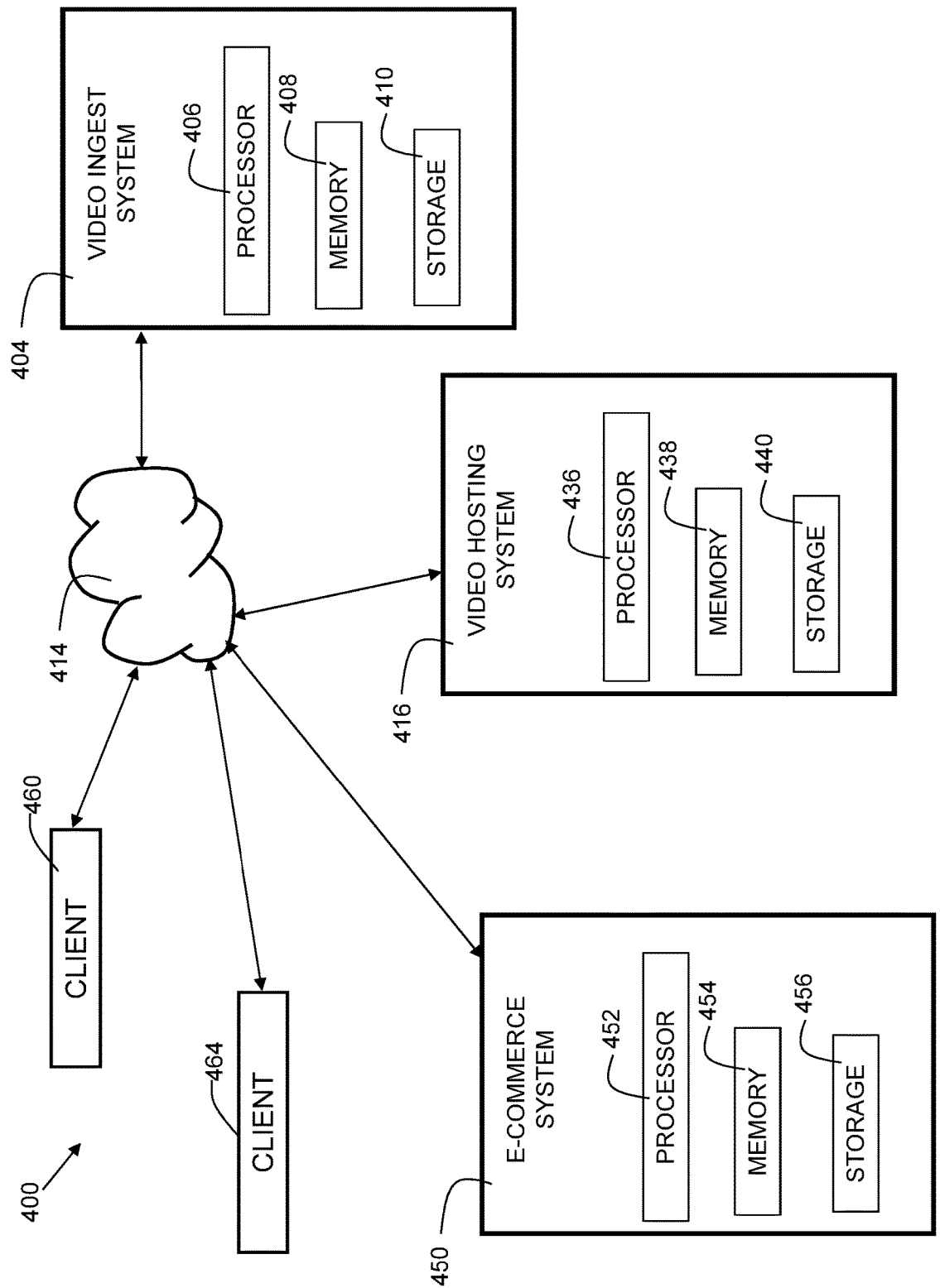
FIG. 4 shows a system diagram for embodiments of the present invention.

FIG. 4 shows a system diagram 400 for embodiments of the present invention. A video ingest system 404 includes a processor 406, memory 408, and storage 410. Memory 408 may include random access memory (RAM), read-only memory (ROM), and/or other suitable memory types. In embodiments, memory 408 may be a non-transitory computer readable medium. Storage 410 may include a hard disk drive (HDD), solid state disk (SSD), and/or other suitable storage technology. Processor 406 may include multiple cores. While one processor 406 is shown, in practice, system 404 may include multiple processors. Video ingest system 404 is connected to network 414. In embodiments, network 414 may include the Internet. In other embodiments, network 414 may include a wide area network (WAN) or local area network (LAN). A plurality of client devices is also connected to network 414. FIG. 4 shows a first client device 460 and a second client device 464 connected to network 414. The client devices may be connected via a wireless or wired network connection. In some embodiments, video ingest system 404 is a server.

In an example use case, a first user uses client 460 and a second user uses client 464. The first user is selling an item to the second user via e-commerce system 450. E-commerce system 450 includes a processor 452, memory 454, and storage 456. Memory 454 may include random access memory (RAM), read-only memory (ROM), and/or other suitable memory types. In embodiments, memory 454 may be a non-transitory computer readable medium. Storage 456 may include a hard disk drive (HDD), solid state disk (SSD), and/or other suitable storage technology. Processor 452 may include multiple cores. While one processor 452 is shown, in practice, system 450 may include multiple processors.

The second user (buyer) initiates a purchase of an item from the first user (seller) via e-commerce system 450. An example of such an e-commerce system can include a marketplace such as Amazon™, and/or an auction site such as eBay™. When the buyer makes a payment, the seller is notified to ship the item. The seller uses an application executing on client 460 to record a temporally continuous video showing the packaging of the item. The video may include showing the wrapping of the item, placing in a shipping carton, sealing the item, applying a mailing label, and/or applying a tamper-evident seal on the shipping carton.

Upon completion of packaging, the seller stops the recording. The application executing on client 460 uploads the temporally continuous video along with associated metadata to the video ingest system 404. The metadata can include, but is not limited to, a date of video acquisition, a time of video acquisition, a location of video acquisition, an ambient temperature during video acquisition, and/or an ambient humidity during video acquisition. The metadata can further include a transaction code that is retrieved from the e-commerce system 450. The transaction code is unique for each transaction conducted on e-commerce system 450. The metadata can further include a digital signature for the video, a hash for the video, and/or a checksum for the video.

The video ingest system 404 receives the video and associated metadata. The video ingest system 404 may perform an authentication to confirm that the received video was recorded with a designated application operating on the client 460. In embodiments, a digital signature process may be employed, where the digital signature included in the metadata is checked using a digital signature process such as based on a hash function such as SHA-1 or SHA-2. In this way, video ingest system 404 can confirm that the received video in fact originated from the designated application operating on the client 460. Thus, embodiments include an application or software program executing on one or more processors.

The video ingest system 404 may, upon successful authentication, perform additional processing, such as compositing a watermark onto the video. The watermark may be composited using alpha blending to render a translucent pattern on a portion of the video. The video ingest system may further superimpose metadata onto the video, or alternatively, prepend or append metadata in text form to the video. The watermark serves as a recognizable feature for a user to identify the video as authenticated. The modified video file, which may include the watermark and/or prepended/appended metadata may then be uploaded to a video hosting system 416. Video hosting system 416 includes a processor 436, memory 438, and storage 440. Memory 438 may include random access memory (RAM), read-only memory (ROM), and/or other suitable memory types. In embodiments, memory 438 may be a non-transitory computer readable medium. Storage 440 may include a hard disk drive (HDD), solid state disk (SSD), and/or other suitable storage technology. Processor 436 may include multiple cores. While one processor 436 is shown, in practice, system 416 may include multiple processors. The video hosting system hosts the modified video, and provides a uniform resource locator (URL) for the modified video.

In embodiments, the URL is provided to the video ingest system 404. The video ingest system 404 then provides the URL, along with the transaction code that was previously retrieved from the e-commerce system 450 back to e-commerce system 450. Thus, the e-commerce system 450 now has received a URL for a video record that is associated with a particular transaction on that e-commerce system. The second user (buyer) receives a status notification via client 464 from e-commerce system 450. The status notification includes information regarding the shipment of the item, along with the URL (or a user interface element linked to the URL) of the video record. In this way, the buyer can observe the packing/shipping of the purchased item. This feature is particularly useful for used and/or collectable one-of-a-kind unique items, where the condition of the item may be prone to dispute. Thus, disclosed embodiments provide a convenient way to protect both the buyer and seller in such transactions.

Figure 5:
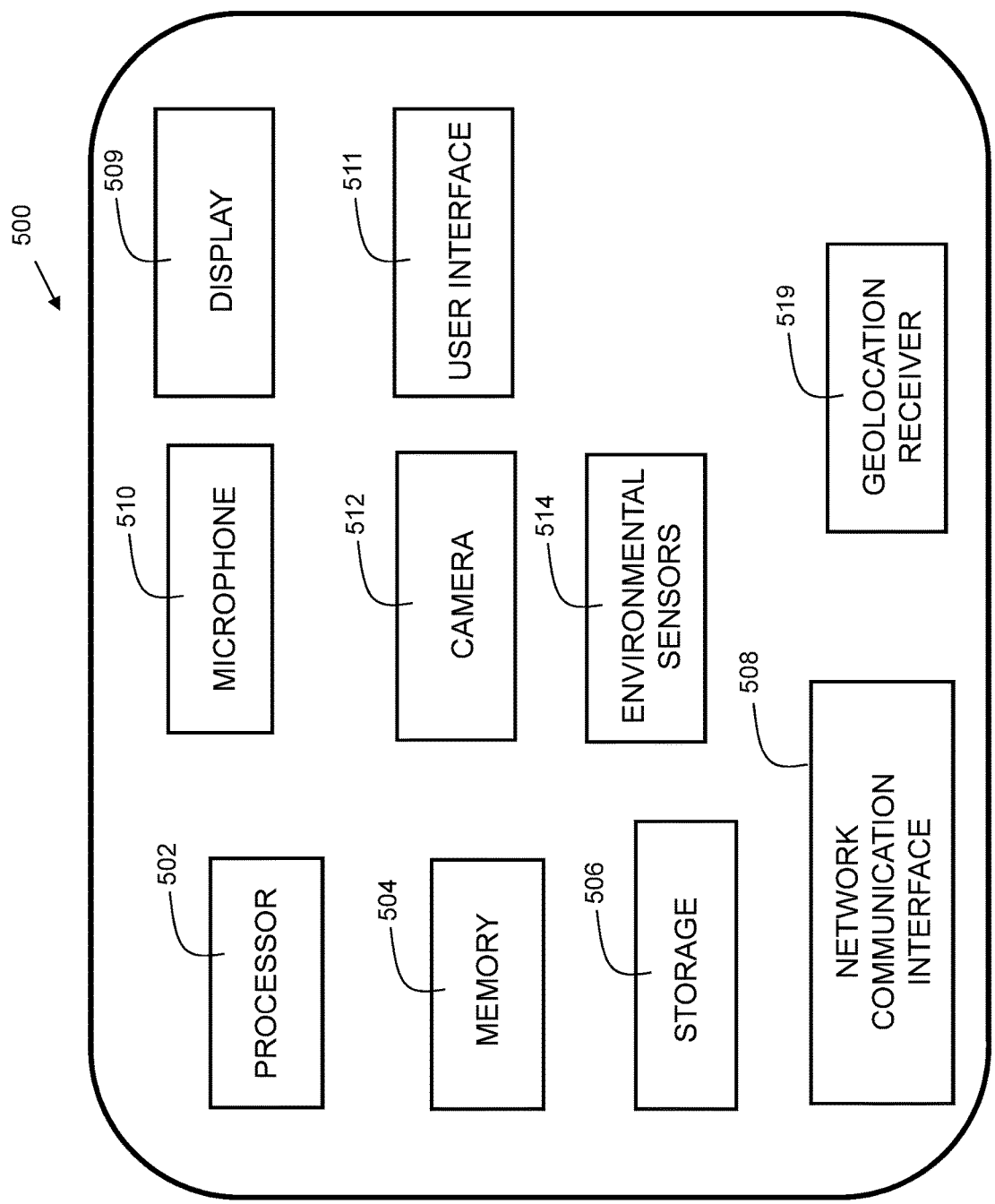
FIG. 5 shows a block diagram for a device in accordance with embodiments of the present invention.

FIG. 5 shows a block diagram for an electronic device (similar to client 460 and/or client 464 of FIG. 4) in accordance with embodiments of the present invention. Device 500 is shown as a simplified diagram of modules. Device 500 is an electronic computing device. Device 500 includes a processor 502, which is coupled to a memory 504. Memory 504 may include dynamic random access memory (DRAM), static random access memory (SRAM), magnetic storage, and/or a read only memory such as flash, EEPROM, optical storage, or other suitable memory. In some embodiments, the memory 504 may be non-transitory memory. Memory 504 includes instructions, which when executed by the processor, may implement one or more steps of embodiments of the present invention.

Device 500 may further include storage 506. In embodiments, storage 506 may include one or more magnetic storage devices such as hard disk drives (HDDs). Storage 506 may include one or more solid state drives (SSDs). Any other storage device may be included instead of, or in addition to, those disclosed herein.

Device 500 may further include a display 509, examples of which include a liquid crystal display (LCD), a plasma display, a light emitting diode (LED) display, an organic LED (OLED) display, or other suitable display technology. The display may include a touch screen incorporating a capacitive or resistive touch screen in some embodiments. The device 500 may further include user interface 511 such as a keyboard, mouse, and/or buttons, etc.

The device 500 may further include a network communication interface 508. In some embodiments, the communication interface 508 may include a wireless communication interface that includes modulators, demodulators, and antennas for a variety of wireless protocols including, but not limited to, Wi-Fi, and/or cellular communication protocols for communication over a computer network.

The device 500 further includes a digital camera 512 and microphone 510. The digital camera 512 and microphone 510 are configured and disposed to acquire a video recording and associated audio recording, and store the recording in memory 504 and/or storage 506.

The device 500 may further include a geolocation receiver 519. The geolocation receiver 519 may include a Global Positioning System (GPS) receiver or other suitable satellite-originating signal receiver, and/or a land-originating signal receiver. In some embodiments, the geolocation receiver 519 may utilize triangulation from multiple signals for position determination.

The device 500 may further include one or more environmental sensors 514. The environmental sensors may include, but are not limited to, temperature, humidity, barometric pressure, and/or altitude sensors.

In embodiments, an application residing in memory 504 executes on processor 502 in order to acquire a video record. The application takes control of the camera 512 and microphone 510 to start the recording process. In embodiments, the application prohibits pausing of the video recording process. Thus, once the record process is stopped, the video record is finished, and is then sent to the server. In such embodiments, the application does not allow resumption of video recording within a single session. Thus, the application provides an authenticated video by ensuring that the uploaded video is temporally continuous. This reduces the possibility of a fraudulent action such as swapping out a product from a shipping carton while the video is paused.

In embodiments, upon stopping the video recording process, the application executing on processor 502 may acquire metadata such as time and date. In embodiments, the current time and date may be received from geolocation receiver 519. The acquired metadata may further include geolocation information from geolocation receiver 519. In some embodiments, the geolocation information includes a latitude and longitude coordinate pair. In some embodiments, a street address lookup may be performed on the latitude and longitude coordinate pair to obtain a street address, intersection, town name, or other identifier of location. Thus, embodiments include receiving a latitude and longitude for the geographic location from the geolocation receiver, and including the latitude and longitude in the added metadata.

The acquired metadata may further include environmental factors such as ambient air temperature, ambient humidity, barometric pressure, and the like. In embodiments, the environmental factors may be obtained from on-board environmental sensors 514. In other embodiments, the environmental factors may be obtained from networked environmental sensors via network communication interface 508.

In some embodiments, the processor 502 may create a modified video by appending or prepending the metadata to the video. The processor may further modify the video by compositing a watermark onto the video. In embodiments, the watermark may be represented as a plurality of pixels where each pixel has an associated level of opacity, ranging from opaque to transparent, which may be used to determine the influence of the pixel color when compositing the pixel with another image pixel from the video source. In embodiments, an opacity level ranging from 20 percent to 40 percent is used, such that the video source is still partially visible behind the watermark. The modified video is then sent to video ingest system 404 (FIG. 4) for archiving, dissemination, and/or additional processing.

Figure 6:
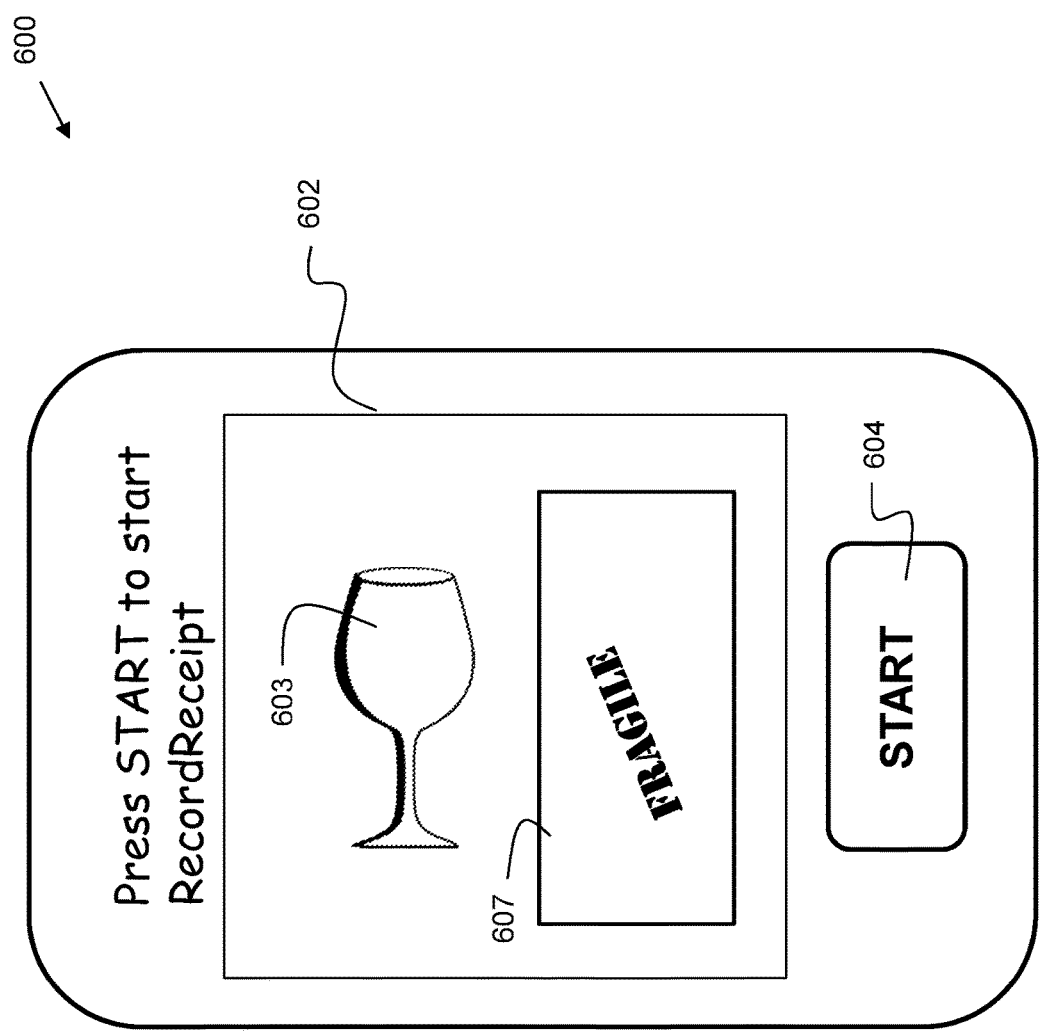
FIG. 6 shows an exemplary user interface prior to creation of a video record.

FIG. 6 shows an exemplary user interface 600 prior to creation of a video record. The user interface may be rendered on a device such as a smartphone, tablet computer, or other mobile device. The user starts the designated application (e.g. by pressing an icon on a touchscreen of the device), and is then presented with a camera view 602, and a start button 604. Within the camera view 602 is shown an item 603 (wine glass) about to be placed in a shipping carton 607. Thus, in the example, a seller is starting a video record of the item 603 being placed in the carton 607.

Figure 7:
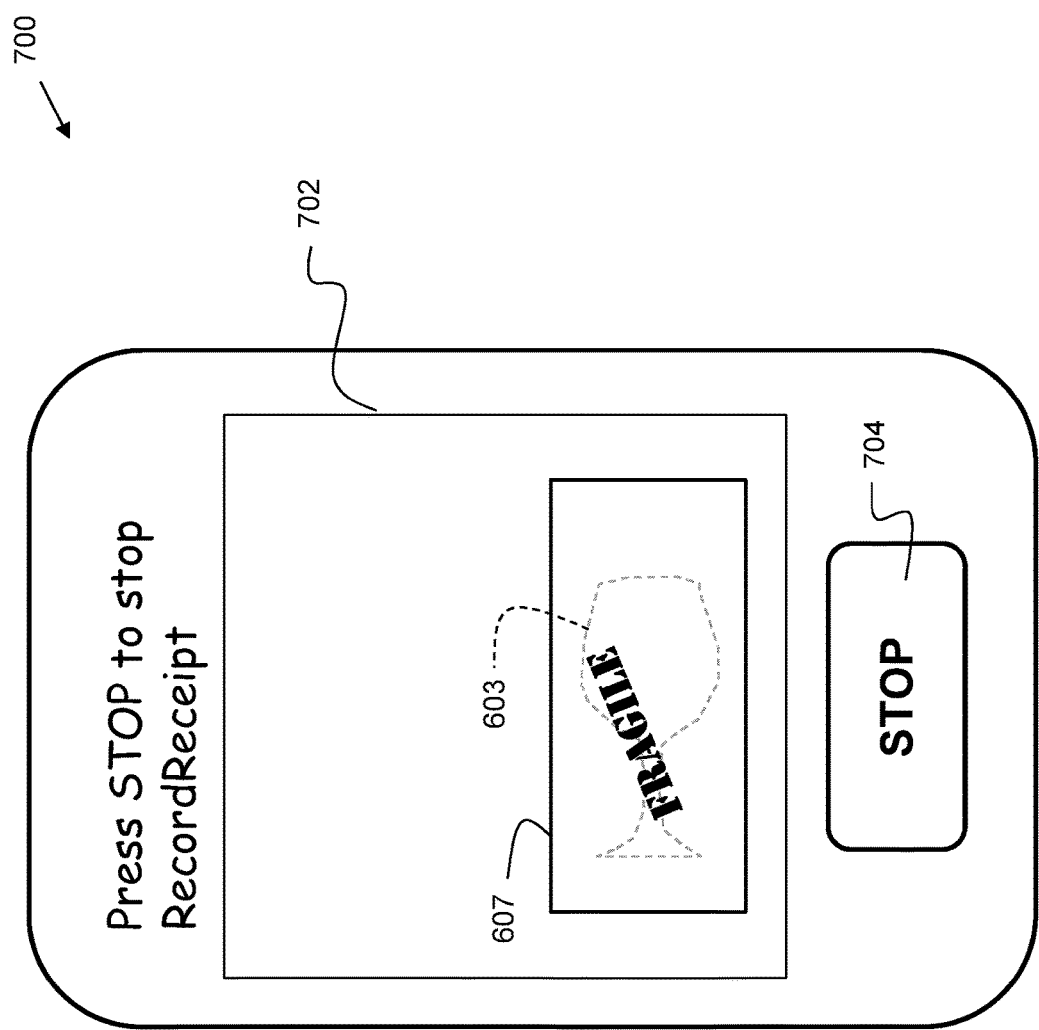
FIG. 7 shows an exemplary user interface during creation of a video record.

FIG. 7 shows an exemplary user interface 700 during creation of a video record. In this phase, the user has placed the item 603 in the shipping carton 607 as shown in camera view 702. The temporally continuous video captures the act of placing the item 603 in the shipping carton 607. Once the recording has started, a stop button 704 appears on the user interface.

Figure 8:
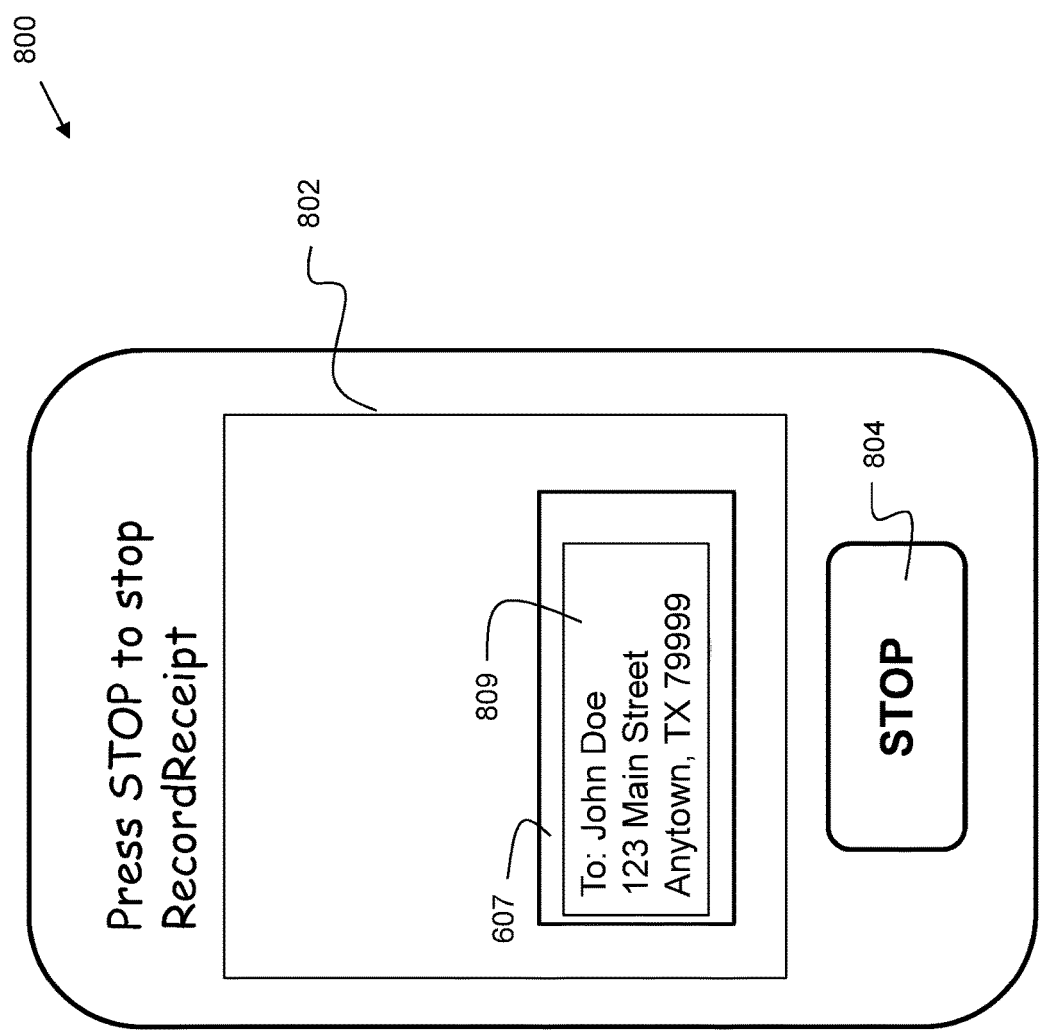
FIG. 8 shows another exemplary user interface during creation of a video record.

FIG. 8 shows another exemplary user interface 800 during creation of a video record. In this phase, the user has placed a shipping label on the shipping carton 607 as shown in camera view 802. The temporally continuous video captures the act of placing the shipping label 809 on the shipping carton 607. At this time, the user can press the stop button 804 to terminate the recording and begin the process of uploading of video, authentication information, and/or metadata to the video ingest system 404 (FIG. 4).

Figure 9:
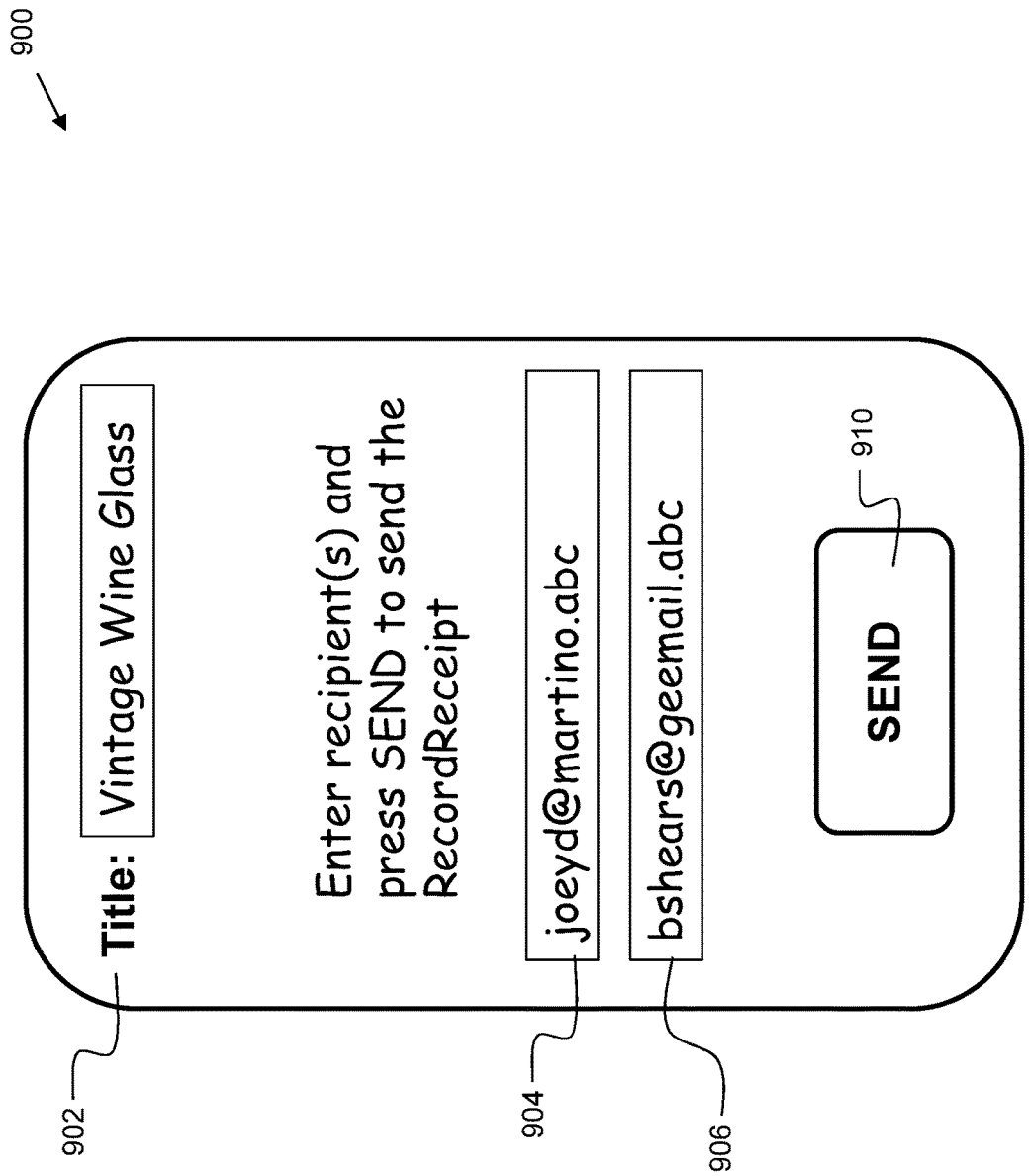
FIG. 9 shows an exemplary user interface for recipient selection.

FIG. 9 shows an exemplary user interface 900 for recipient selection. Upon completion of the video recording, the user is prompted to enter a title in title field 902, and to enter contact information for one or more recipients. In the example, contact information for two recipients is shown in fields 904 and 906. The recipients receive an email with a link (URL) for the uploaded video that includes the metadata and/or authentication information. Note that while the example shows email addresses, other types of contact information such as telephone numbers may be used for sending a link via a text message. The user then invokes the send button 910 to send the messages to the recipients.

Figure 10:
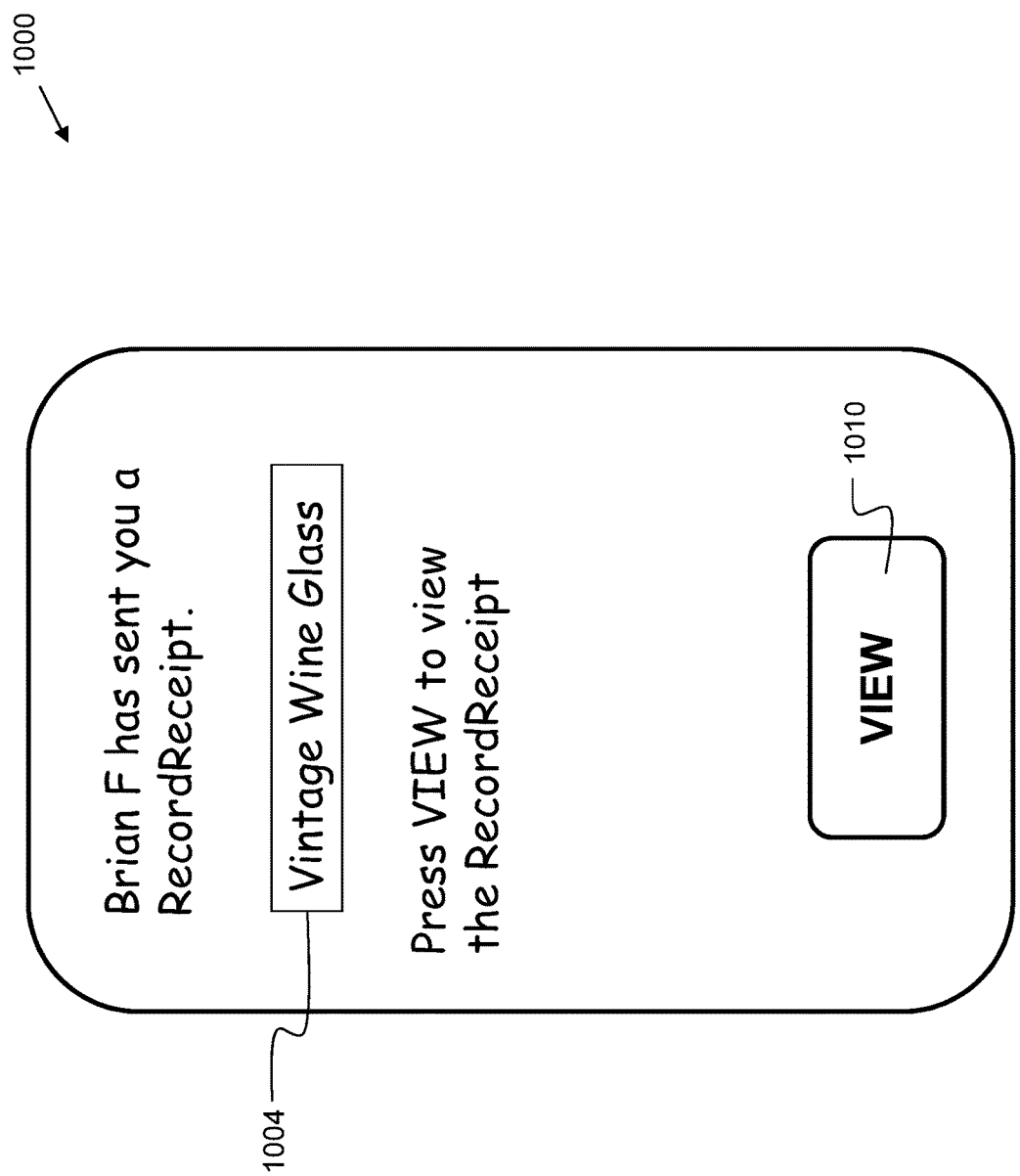
FIG. 10 shows an exemplary user interface for video record receiving.

FIG. 10 shows an exemplary user interface 1000 for video record receiving. The user interface includes a title field 1004 and a view button 1010. The user presses the view button 1010 to download and/or stream the video from the video hosting system 416.

Figure 11:
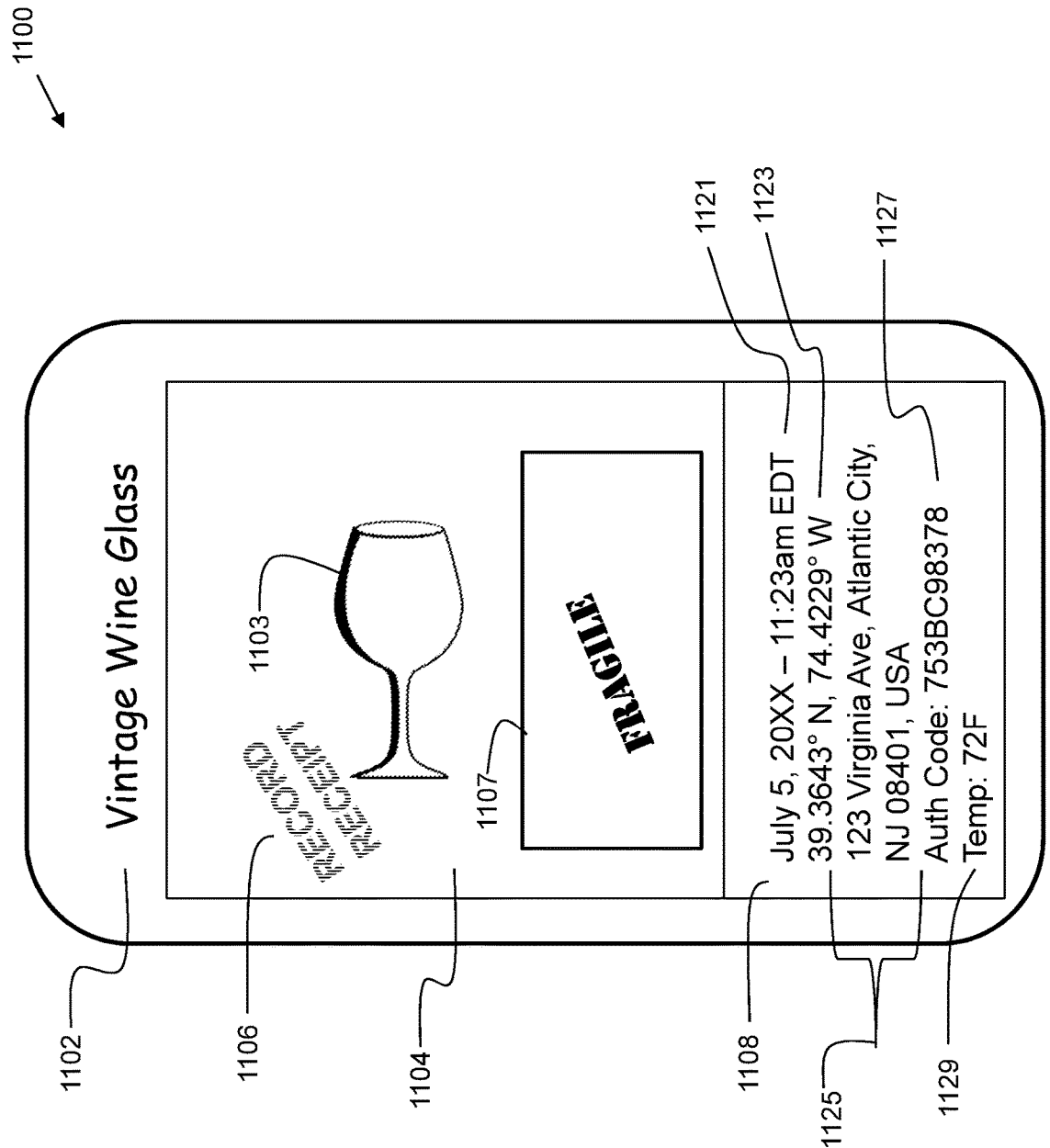
FIG. 11 shows an exemplary user interface for video record viewing.

FIG. 11 shows an exemplary user interface 1100 for video record viewing. The user interface includes a title 1102. A video window 1104 shows the video recorded by the seller of the item 1103 being placed into the shipping carton 1107 (as was recorded during the process previously described and shown in FIG. 6). A watermark 1106 is composited onto the video. The watermark 1106 serves as a visual indication of the authenticity of the video. In embodiments, the watermark 1106 is partially transparent. Thus, embodiments include compositing a watermark onto the received video.

In embodiments, metadata 1108 is shown below the video window 1104. In other embodiments, metadata 1108 can be prepended, appended, or superimposed on the video window 1104. The metadata 1108 includes a date and time of recording 1121, geographical coordinates of latitude and longitude 1123, street/address information 1125, an authentication code 1127, and an environmental condition of ambient temperature 1129. This combination of metadata is merely exemplary, and other embodiments may include more, fewer, or different combinations of metadata. Embodiments include obtaining a street address for the latitude and longitude, and including the street address in the metadata.

The street/address information 1125 may in embodiments, be obtained by accessing a street database via a communications network such as the Internet to perform a lookup based on the coordinates shown at 1123. The ambient temperature 1129 may be retrieved from a sensor onboard the acquiring device (e.g. client 460 of FIG. 4), or alternatively retrieved via a networked temperature sensor. Certain delicate items such as antique paintings, cigars, wines, live plants, foods, and the like may have strict handling requirements in terms of temperature range and humidity range that they are subjected to. Thus, disclosed embodiments can provide evidence of the ambient conditions of delicate times at the time of packaging. Embodiments include acquiring ambient conditions for the video.

In embodiments, the authentication code 1127 may be generated by combining a random number with a meaningful number such as a digital signature, hash of the video file, or other identifying information. In embodiments, the authentication code may be encoded with check digits to improve security. In embodiments, an ISO 7064 Mod 97-10 scheme may be used to encode authentication codes, adding another level of complication for malicious actors attempting to spoof an authentication code. Thus, embodiments include generating an authentication code for the video, and adding the authentication code to the video.

Figure 12:
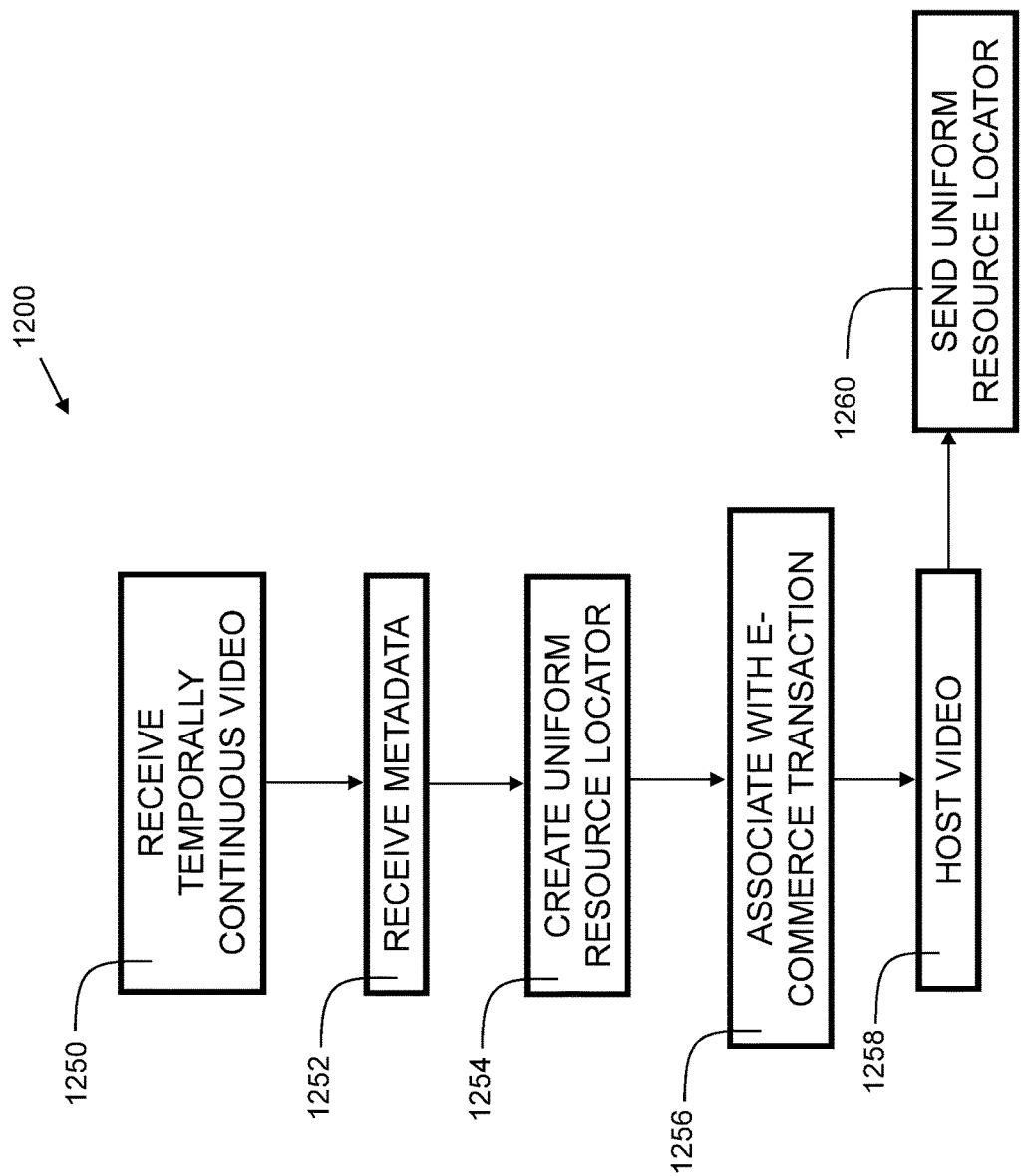
FIG. 12 is a flowchart indicating process steps for server operation in accordance with embodiments of the present invention.

FIG. 12 is a flowchart 1200 indicating process steps for server operation in accordance with embodiments of the present invention. In process step 1250, a temporally continuous video is received from a client device executing a designated application. In process step 1252, metadata pertaining to the video is received. The metadata may include, but is not limited to, a time, a date, a location, a temperature, a humidity, a barometric pressure, and/or a transaction code. In process step 1254, a uniform resource locator for the video is created. The video may be a modified video that includes incorporation of one or more pieces of metadata received in process step 1252. Optionally, in some embodiments, the modified video may further include a composited watermark applied by the video ingest system 404. Optionally, in process step 1256, the URL from process step 1254 is associated with an e-commerce transaction. This may be performed by receiving a transaction code from e-commerce system 450 as part of the received metadata. In process step 1258, the video is hosted. In embodiments, the video is hosted on a video hosting system 416 that is managed by the same party that manages the video ingest system 404. However, in other embodiments, the video hosting can be decoupled from the video ingest. In this way, the e-commerce provider can optionally perform the hosting, or a third party can perform the hosting. In process step 1260, the URL corresponding to the authenticated video is sent to recipients and/or the e-commerce system.

Note that some embodiments of the present invention may be utilized without an e-commerce system. For example, two parties can use embodiments of the present invention to provide record of shipment for a private sale that does not involve an e-commerce site. Also note that some of the process steps may be executed in a different order than that shown in FIG. 12, and furthermore, in some embodiments, one or more of the process steps may be performed simultaneously.

Figure 13:
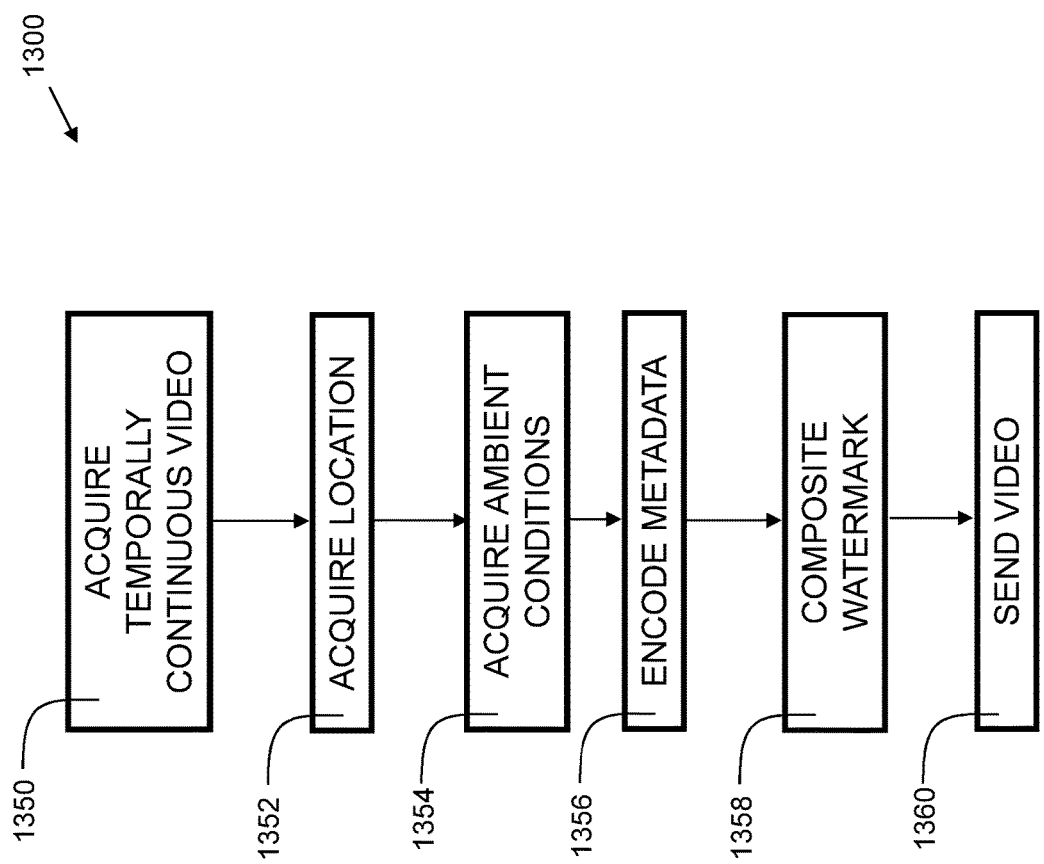
FIG. 13 is a flowchart indicating process steps for client operation in accordance with embodiments of the present invention.

FIG. 13 is a flowchart 1300 indicating process steps for client operation in accordance with embodiments of the present invention. In process step 1350, a temporally continuous video is acquired from a client device (e.g. client 460 of FIG. 4). In process step 1352, a location is acquired. In embodiments, the location may be acquired from a geolocation receiver such as 519 of FIG. 5. In process step 1354, ambient conditions are acquired. The ambient conditions may include temperature, humidity, and/or barometric pressure at the time of shipping. In process step 1356, the metadata is encoded into the video. The metadata may be prepended, appended, or superimposed on the video. Additionally, the metadata may be sent in a data header appended or prepended to the video file, or otherwise transmitted along with the video file. In process step 1358, a watermark is composited onto the video. Thus, embodiments include compositing a watermark onto the video prior to the sending of the video to the video server. The watermark serves as an indication of the authenticity of the video. In process step 1360, the video is sent to the video ingest system (404 of FIG. 4).

FIG. 14 is an exemplary e-commerce interface 1400 showing integration of a video record in accordance with embodiments of the present invention. Disclosed embodiments provide an improved level of convenience for creating authenticated videos pertaining to an e-commerce transaction with the transaction record in the e-commerce system. The user interface 1400 includes an image of the item 1406, and a make video record button 1404. The make video record button 1404 then invokes the designated application to make a video such as is depicted in FIGS. 6-8. The transaction code 1407 is provided to the designated application. The transaction code is part of the metadata that is encoded into, or attached to, or otherwise associated with the video. When the video is complete and successfully hosted, the video ingest system sends the corresponding URL along with the transaction code 1407. This allows the e-commerce system to conveniently associate the video with the transaction record for presentation to the seller. Thus, embodiments include receiving a transaction code from an e-commerce system, associating the authentication code with the transaction code, and sending the uniform resource locator to the e-commerce system.

Figure 15:
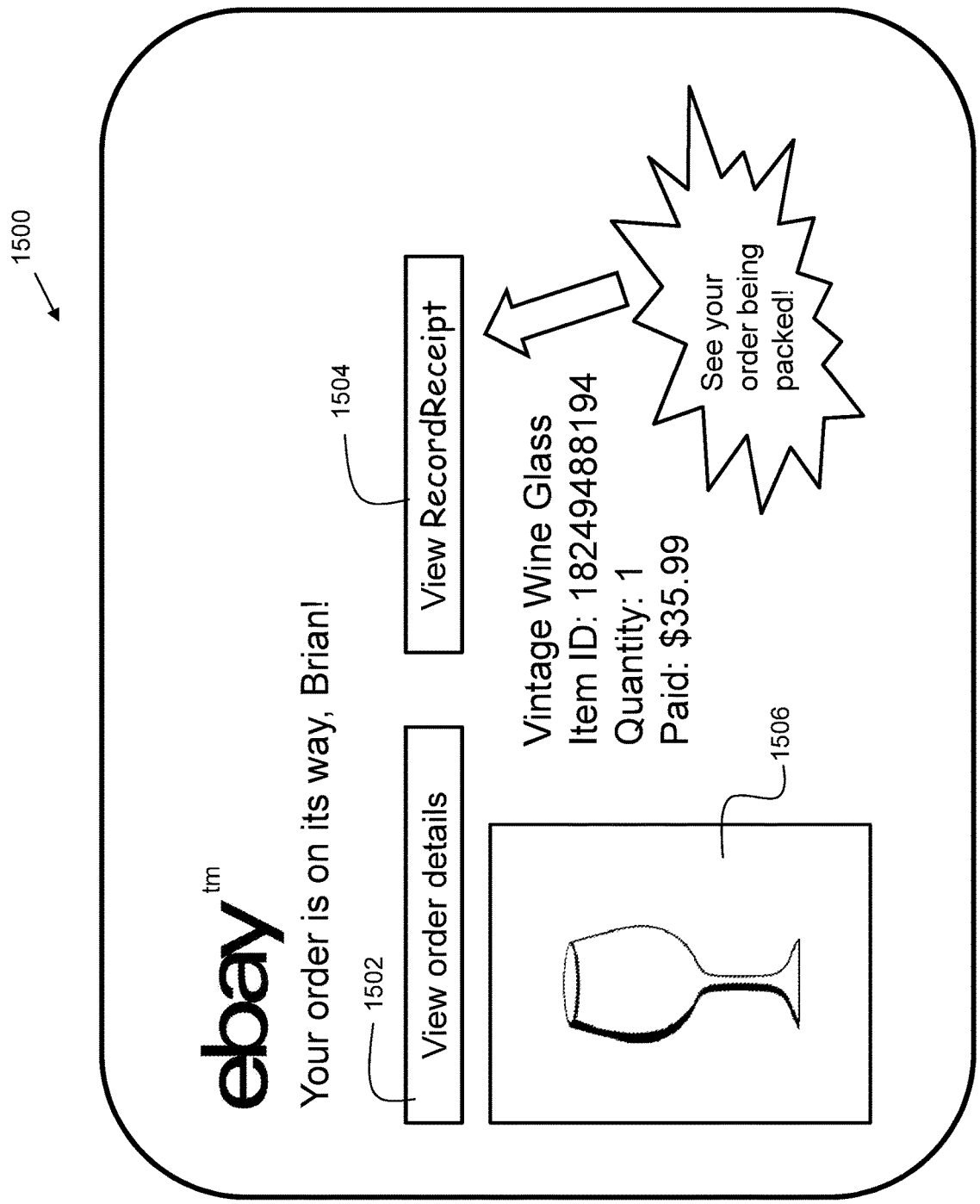
FIG. 15 is an exemplary e-commerce interface showing additional integration of a video record in accordance with embodiments of the present invention.

FIG. 15 is an exemplary e-commerce interface 1500 showing additional integration of a video record in accordance with embodiments of the present invention. Disclosed embodiments provide an improved level of convenience for viewing authenticated videos pertaining to an e-commerce transaction with the transaction record in the e-commerce system. The user interface 1500 includes an image of the item 1506, an order details button 1502 to allow viewing of additional order details, and a View RecordReceipt button 1504. The View RecordReceipt button 1504 is associated with the URL sent in process step 1260 of FIG. 12. Thus, when the user selects the View RecordReceipt button 1504, the user is presented with a video such as depicted in FIG. 11. To facilitate the integration of the video recording and authentication into the e-commerce system, a plurality of application programming interfaces (APIs) may be exposed by the video ingest system 404 to enable another system such as an e-commerce system to receive URLs corresponding to videos associated with transactions within the e-commerce system. Various elements such as the video ingest system 404, client devices, e-commerce system, and video hosting system may utilize a variety of computing and/or networking protocols including, but not limited to, TCP/IP, UDP, HTTP, SSH, Javascript, JSON files, and other suitable protocols.

Figure 16:
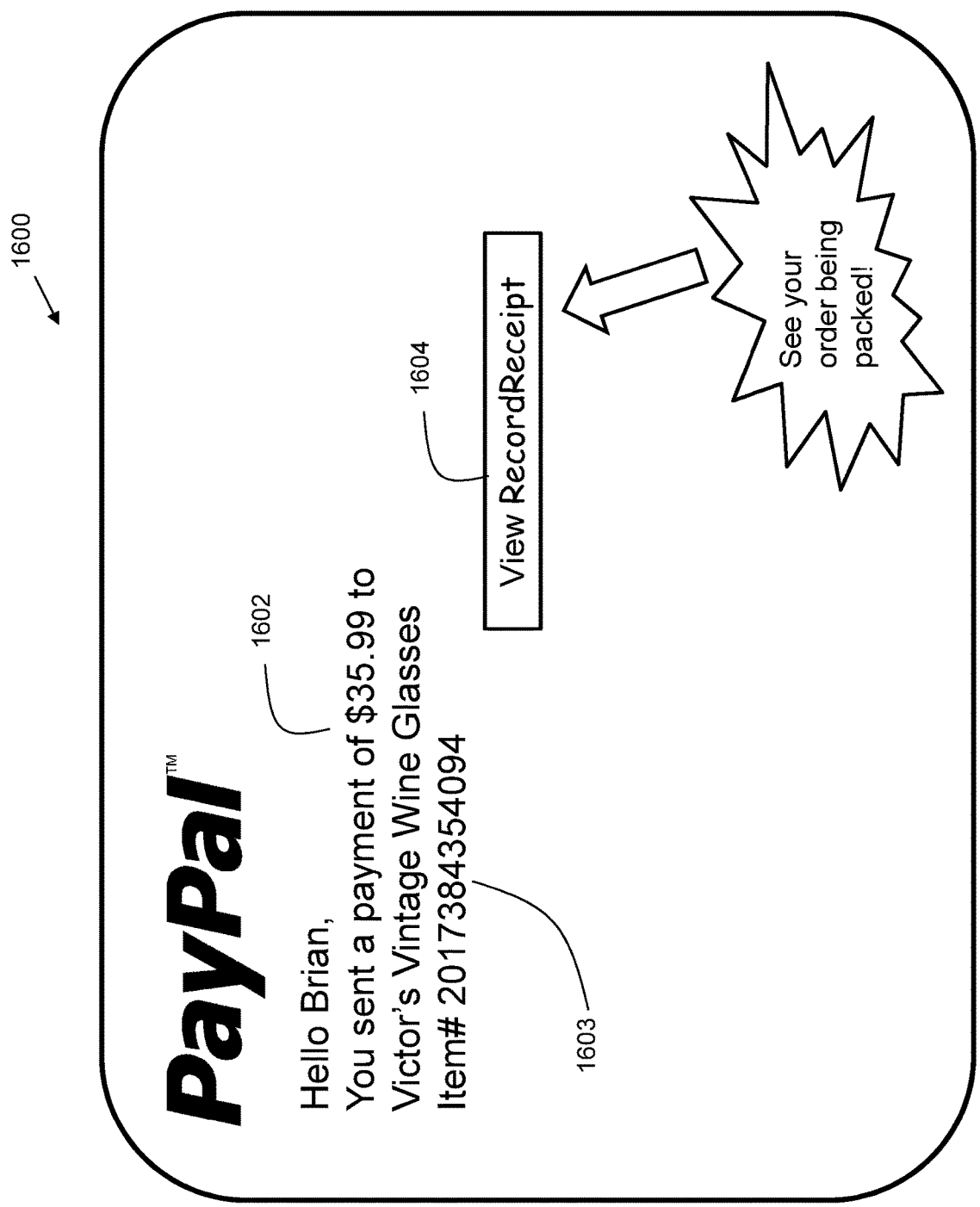
FIG. 16 is an exemplary payment portal showing integration of a video record in accordance with embodiments of the present invention.

FIG. 16 is an exemplary payment portal interface 1600 showing integration of a video record in accordance with embodiments of the present invention. Disclosed embodiments provide an improved level of convenience for creating authenticated videos pertaining to a payment transaction with the transaction record (and/or item number) in the payment portal. The payment portal can include PayPal™ or other suitable payment portal. The user interface 1600 includes a description 1602 and an item number 1603. The View RecordReceipt button 1604 is associated with the URL sent in process step 1260 of FIG. 12. Thus, when the user selects the View RecordReceipt button 1604, the user is presented with a video such as depicted in FIG. 11.

Figure 17:
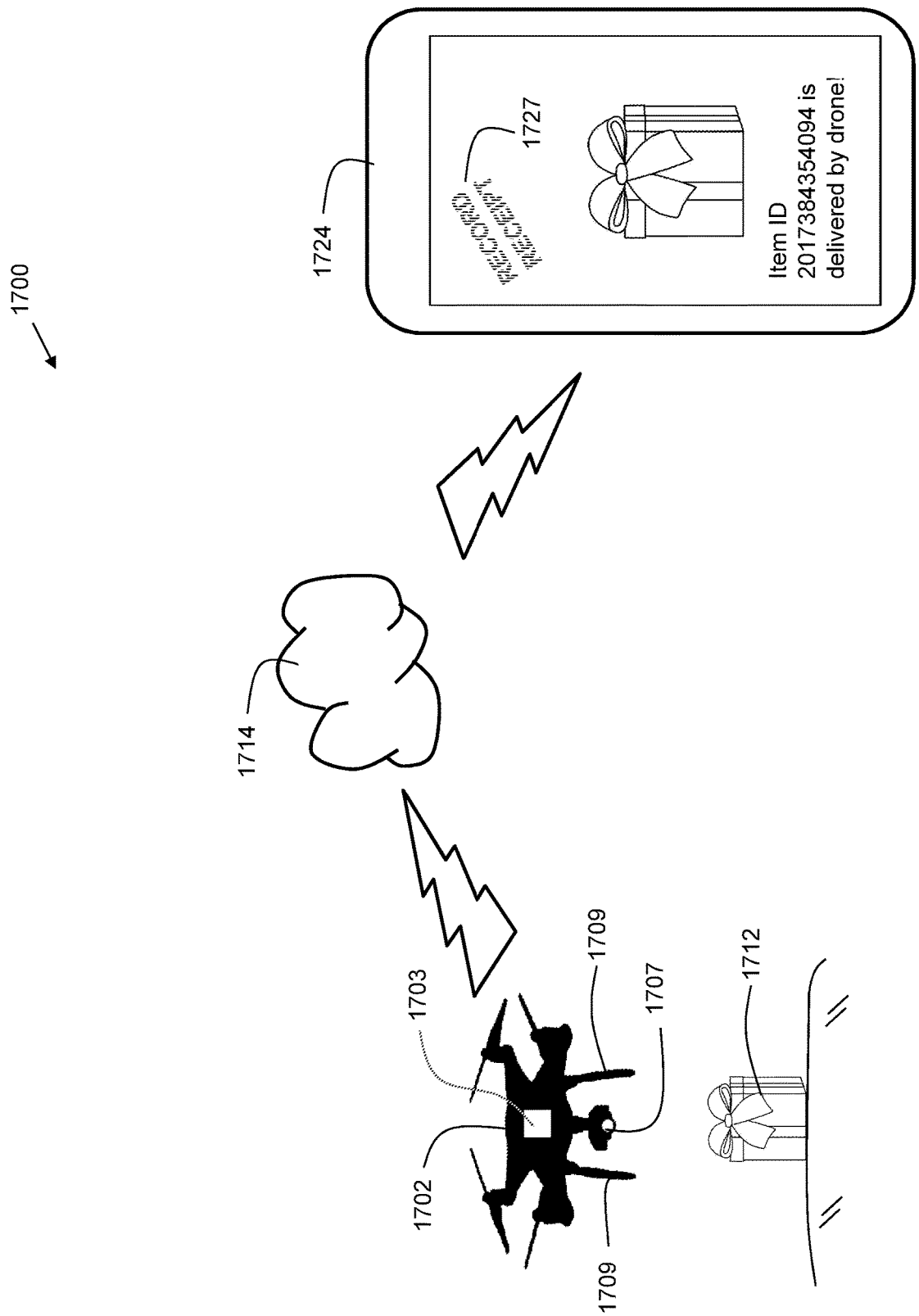
FIG. 17 is an embodiment including a drone delivery process.

FIG. 17 is an embodiment including a drone delivery process. Example 1700 shows a drone 1702 configured for delivery of packages. The drone 1702 is an unmanned aircraft including a propulsion mechanism such as one or more propellers. The drone 1702 includes a processing unit 1703 that includes a processor and a computer readable medium for storing instructions. The processing unit 1703 may perform functions including, but not limited to, flight control, guidance, navigation, status reporting. And the like. The drone 1702 includes a camera 1707 and calipers 1709 configured for holding a package in flight. The camera 1707 is coupled to the processing unit 1703 of drone 1702. The drone 1702 is configured to fly to a particular location, and release the package 1712 on or close to the ground or other surface. The drone 1702 may be equipped with a communication device such as a cellular and/or Wi-Fi communication device. The drone 1702 can create a RecordReceipt using camera 1707, and send it via network 1714 to a client device 1724 where a user can view the RecordReceipt of the package being delivered. The RecordReceipt may include a watermark 1727. Thus, embodiments can include a method of package delivery including releasing a package from a drone at a location, recording, with a camera, the package being released from the drone, creating a RecordReceipt (video recording), compositing a watermark onto the video, and delivering the video to a client device. In this way, both the recipient and the sender can have confidence that the drone delivery was successful.

Figure 18B:
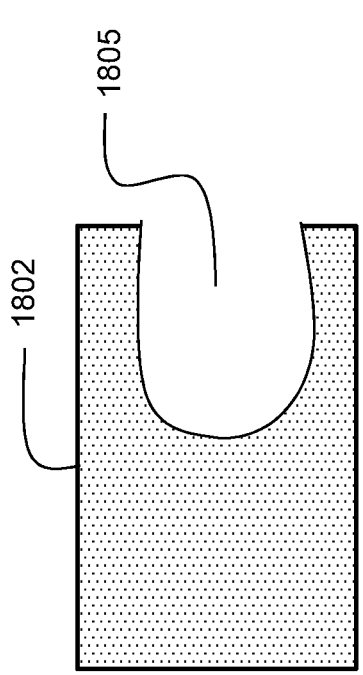
FIGS. 18A-18C show examples of a kiosk embodiment of the present invention.
Figure 18C:
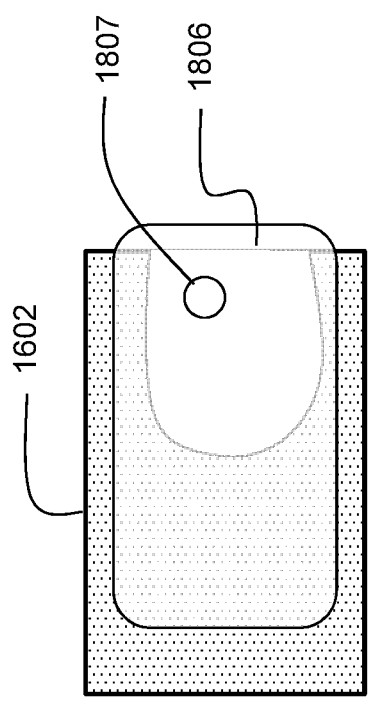
Figure 18A:
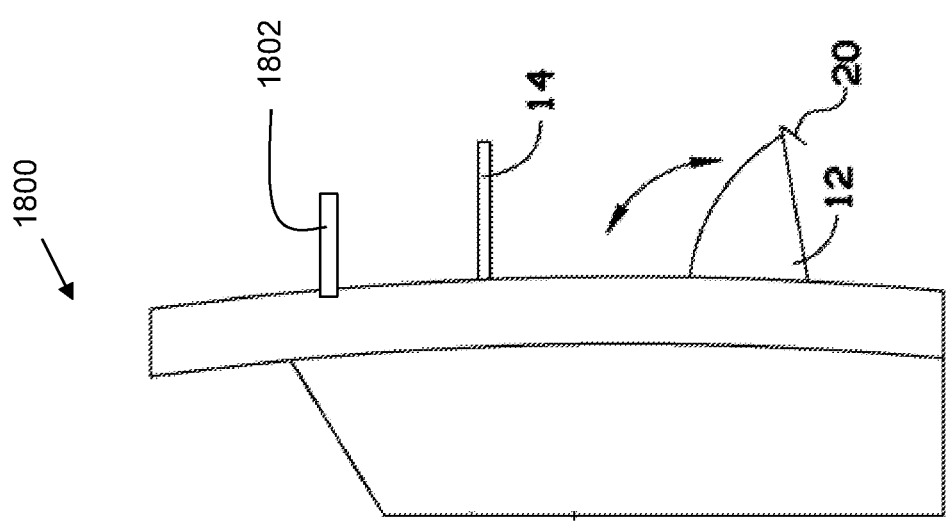

FIGS. 18A-18C show examples of a kiosk embodiment of the present invention. Kiosk 1800 is mechanically similar to kiosk 10 shown in FIG. 2. However, instead of having an integrated camera and dedicated server connection such as described for kiosk 10, kiosk 1800 instead includes device holder 1802 (shown in a side view) oriented above surface 14. A top-down view of holder 1802 is shown in FIG. 18B, comprising cutout 1805. FIG. 18C shows use of the holder 1802 of kiosk 1800 by placement of a mobile device 1806 on the holder 1802 such that the camera 1807 is facing the surface 14. The user can then start the recording process as the item is packaged and shipped, and placed in drop box 12. In this way, a shipping facility such as a post office or courier location (e.g. FedEx™ or UPS™) can easily employ embodiments of the present invention. Thus, kiosk 1800 has a reduced cost as compared with kiosk 10, since kiosk 1600 utilizes the user's mobile device with designated application for acquiring the authenticated video record.

As can now be appreciated, disclosed embodiments provide authenticated video creation and dissemination methods and systems. A designated application executing on a client device prohibits pausing of a video recording once in progress. Once the video is stopped, the video record (RecordReceipt) is finalized, and sent to a server. The server authenticates the received video from the client device. The server then disseminates a URL for the video to recipients. The recipients can retrieve the video using the URL. The authentication ensures that the video originated from the designated application on the client device that prohibits pausing. Thus, there is no easy way for the originating party to perform any editing on the video to hide any malicious actions (e.g. swapping a new item for a used item prior to shipping). Disclosed embodiments can integrate with e-commerce systems and/or video hosting systems to enable a distributed environment for creating and sharing the authenticated videos. This allows for an improved level of consumer protection of both buyers and sellers using e-commerce systems such as auction sites and marketplace sites.

Furthermore, RecordReceipt is not only designed for e-commerce transactions but any and all services or transactions that need video verification that depicts details that are often omitted from black and white receipts. RecordReceipt also provides a form of Mediation and/or verification of an agreement and/or service and/or transaction.

Additionally, RecordReceipt allows a seller/sender to confirm condition of the item being packaged and shipped and RecordReceipt is also designed to illustrate the details of a service or transaction. RecordReceipt serves as a video receipt to confirm that a product, service, or transaction was completed while also capturing the details regarding the events in question. In some use cases, a RecordReceipt can replace or be viewed equivalent to a Notary Public that confirms identity for proof of record). In such an embodiment, a user may record a display of his/her driver's license, then record themselves in the video, then record themselves signing a document (like a lease) and then user would press stop and send the link to the landlord for verification. Thus, RecordReceipt focuses on the transaction (what items were purchased, what were the conditions of the items purchased). RecordReceipt serves as a video mediator to help eliminate hearsay accounts of what transpired during a transaction.

In yet another embodiment, RecordReceipt could also be used during the submission of tax returns to verify identity of each tax payer while helping to reduce the number of fraudulent tax returns submitted to the United States Internal Revenue Service (IRS) annually. By using RecordReceipt, the IRS would be able to build a verification database which could catalog identities to prevent fraud that could be used from year to year in an effort to prevent fraudulent tax returns. For example, if the RecordReceipt video includes an image or video clip of the tax filer, then an image processing/facial recognition system can flag a case where the user appearance drastically varies from a previous filing, indicating a potentially fraudulent tax filing that can be further investigated. In this embodiment RecordReceipt serves as an additional security tool.

Additionally, while some embodiments may utilize a mobile device such as a smartphone or tablet computer, other embodiments may utilize other types of devices. These can include wearable devices such as eyeglasses, wristwatches, action cameras, and the like. Additionally, embodiments may include flying drones. In such an embodiment, a drone used for package delivery can create a RecordReceipt showing the delivery of the package. The RecordReceipt is provided to the recipient and/or sender of the package.

In some embodiments, the initiation of the RecordReceipt may be performed automatically by a robot or computer utilizing artificial intelligence, machine learning, natural language processing, image processing, computer vision, and/or other suitable mechanism. In such an embodiment, the RecordReceipt can be viewed by a human to confirm that the automated process succeeded.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. An electronic device, comprising:
    an unmanned aircraft, the unmanned aircraft comprising:
        a processor;
        a memory coupled to the processor;
        one or more environmental sensors including a temperature sensor that captures ambient air temperature;
        a set of calipers disposed on an underside of the unmanned aircraft, configured and disposed to secure a package;
    a digital camera disposed on the underside of the unmanned aircraft, and coupled to the processor;
    wherein the memory contains instructions, that when executed by the processor, perform steps of:
        delivering the package from a sender to a recipient via the unmanned aircraft by releasing the package from the set of calipers; creating a temporally continuous video by:
            starting a video recording session with the digital camera prior to said releasing the package from the set of calipers of the unmanned aircraft;
            stopping the video recording session after releasing the package from the set of calipers of the unmanned aircraft, wherein the video recording session records said releasing the package from the set of calipers of the unmanned aircraft;
            saving the video recording session as a file;
            adding metadata to the file, wherein the metadata includes a digital signature for the file, and the ambient air temperature;
            compositing a watermark onto the temporally continuous video, wherein the watermark includes a translucent pattern on a portion of the temporally continuous video;
            sending the file to a video server; and
        wherein the video server uses the digital signature included in the metadata to authenticate the file, and sends to the sender and the recipient, a uniform resource locator (URL) corresponding to a storage location of the temporally continuous video on the video server, thereby providing an authenticated record of delivery to both the sender and the recipient.

2. The electronic device of claim 1, wherein the memory further contains instructions, that when executed by the processor, perform steps of receiving a date for the temporally continuous video.

3. The electronic device of claim 1, wherein the unmanned aircraft further comprises a geolocation receiver, and wherein the memory further contains instructions, that when executed by the processor, perform steps of receiving a geographic location for the temporally continuous video from the geolocation receiver.

4. The electronic device of claim 3, wherein the memory further contains instructions, that when executed by the processor, perform steps of receiving a latitude and longitude for the geographic location from the geolocation receiver, and including the latitude and longitude in the metadata.

5. The electronic device of claim 4, wherein the memory further contains instructions, that when executed by the processor, perform steps of obtaining a street address for the latitude and longitude, and including the street address in the metadata.

6. A non-transitory computer readable storage medium having program instructions embodied therewith, the program instructions executable by a processor of an unmanned aircraft, to cause the unmanned aircraft to perform steps of:
    delivering the package from a sender to a recipient via the unmanned aircraft by releasing the package from a set of calipers disposed on an underside of the unmanned aircraft;
    creating a temporally continuous video by:
        starting a video recording session from a digital camera disposed on the underside of the unmanned aircraft prior to said releasing the package from the set of calipers of the unmanned aircraft;
        stopping the video recording session after releasing the package from the set of calipers of the unmanned aircraft;
        saving the video recording session as a file;
        adding metadata to the file, wherein the metadata includes a digital signature for the file, and an ambient air temperature captured by a temperature sensor included in one or more environmental sensors of the unmanned aircraft;
        compositing a watermark onto the temporally continuous video, wherein the watermark includes a translucent pattern on a portion of the temporally continuous video;
        sending the file to a video server; and
    wherein the video server uses the digital signature included in the metadata to authenticate the file, and sends to the sender and the recipient, a uniform resource locator (URL) corresponding to a storage location of the temporally continuous video on the video server, thereby providing an authenticated record of delivery to both the sender and the recipient.

7. The non-transitory computer readable storage medium of claim 6, further comprising program instructions executable by the processor to cause the unmanned aircraft to acquire a geographic location for the temporally continuous video.

8. A computer-implemented method for recording a delivery of a package by an unmanned aircraft, comprising:
    delivering, by a processor of an unmanned aircraft, the package from a sender to a recipient via the unmanned aircraft by releasing the package from the set of calipers;
    creating, by the processor of the unmanned aircraft, a temporally continuous video by:
        starting, by the processor of the unmanned aircraft, a video recording session with the digital camera prior to said releasing the package from the set of calipers of the unmanned aircraft;
        stopping, by the processor of the unmanned aircraft, the video recording session after said releasing the package from the set of calipers of the unmanned aircraft, wherein the video recording session records said releasing the package from the set of calipers of the unmanned aircraft;

saving, by the processor of the unmanned aircraft, the video recording session as a file;

adding, by the processor of the unmanned aircraft, metadata to the file, wherein the metadata includes a digital signature for the file, and an ambient air temperature captured by a temperature sensor included in one or more environmental sensors of the unmanned aircraft;

compositing, by the processor of the unmanned aircraft, a watermark onto the temporally continuous video, wherein the watermark includes a translucent pattern on a portion of the temporally continuous video;

sending, by the processor of the unmanned aircraft, the file to a video server; and wherein the video server uses the digital signature included in the metadata to authenticate the file, and wherein the video server sends to the sender and the recipient, a uniform resource locator (URL) corresponding to a storage location of the temporally continuous video on the video server, thereby providing an authenticated record of delivery to both the sender and the recipient.

9. The method of claim 8, wherein the metadata includes a title.

10. The method of claim 8, wherein the metadata includes a date.

11. The method of claim 8, wherein the metadata includes a geographic location.

12. The method of claim 11, wherein the geographic location includes latitude and longitude.

13. The method of claim 11, wherein the geographic location includes a street address.

* * * * *